(12) United States Patent
Kim et al.

(10) Patent No.: US 12,168,903 B2
(45) Date of Patent: Dec. 17, 2024

(54) HINGE STRUCTURE AND ELECTRONIC DEVICE INCLUDING THE SAME

(71) Applicant: Samsung Electronics Co., Ltd., Suwon-si (KR)

(72) Inventors: Hyungsoo Kim, Suwon-si (KR); Jaehee Kim, Suwon-si (KR); Chongkun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/485,783

(22) Filed: Oct. 12, 2023

(65) Prior Publication Data
US 2024/0035324 A1  Feb. 1, 2024

Related U.S. Application Data

(63) Continuation of application No. 17/425,623, filed as application No. PCT/KR2021/009351 on Jul. 20, 2021, now Pat. No. 11,788,330.

(30) Foreign Application Priority Data

Jul. 24, 2020 (KR) .................. 10-2020-0092496

(51) Int. Cl.
*E05D 3/06* (2006.01)
*E05D 3/12* (2006.01)
(Continued)

(52) U.S. Cl.
CPC .............. *E05D 3/122* (2013.01); *E05D 3/18* (2013.01); *E05D 11/105* (2013.01); *E05Y 2999/00* (2024.05)

(58) Field of Classification Search
CPC .. H04M 1/022; H04M 1/0214; H04M 1/0216; H04M 1/0222; H05K 5/0226;
(Continued)

(56) References Cited

U.S. PATENT DOCUMENTS

| 8,938,856 B1 | 1/2015 | Shin et al. |
| 10,659,576 B1 | 5/2020 | Hsu et al. |

(Continued)

FOREIGN PATENT DOCUMENTS

| CN | 203906536 U | 10/2014 |
| CN | 210178745 U | 3/2020 |

(Continued)

OTHER PUBLICATIONS

Indian Office Action dated May 7, 2024, issued in Indian Application No. 202317003913.

(Continued)

*Primary Examiner* — Chuck Y Mah
(74) *Attorney, Agent, or Firm* — Jefferson IP Law, LLP

(57) ABSTRACT

A hinge structure is provided. The hinge structure includes a fixed structure including a first guide rail and a second guide rail, a center of an arc of the first guide rail is a first axis of rotation parallel to an axial direction and a center of an arc of the second guide rail is a second axis of rotation parallel to the axial direction, a first rotary structure including a first guide portion accommodated in the first guide rail and a first helical groove extending around and along the first axis of rotation, a second rotary structure including a second guide portion accommodated in the second guide rail and a second helical groove extending around and along the second axis of rotation, and a sliding structure including a first guide protrusion accommodated in the first helical groove and a second guide protrusion accommodated in the second helical groove.

20 Claims, 30 Drawing Sheets

(51) Int. Cl.
*E05D 3/18* (2006.01)
*E05D 11/10* (2006.01)

(58) Field of Classification Search
CPC ... F16M 11/10; E05D 11/105; E05D 11/1021; E05D 11/1078; E05D 11/082; E05D 3/14; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606; E05Y 2999/00
See application file for complete search history.

(56) References Cited

U.S. PATENT DOCUMENTS

| | | |
|---|---|---|
| 10,664,021 B1 | 5/2020 | Hsu et al. |
| 10,761,573 B2 | 9/2020 | Hsu |
| 11,589,471 B2 | 2/2023 | Zhang et al. |
| 2017/0235337 A1 | 8/2017 | Vic et al. |
| 2020/0103935 A1 | 4/2020 | Hsu |
| 2020/0409427 A1 | 12/2020 | Hsu |
| 2021/0173449 A1 | 6/2021 | Yao et al. |
| 2021/0208641 A1 | 7/2021 | Huang et al. |
| 2021/0267077 A1 | 8/2021 | Zhang et al. |
| 2021/0368032 A1 | 11/2021 | Liao et al. |
| 2022/0086265 A1 | 3/2022 | Shang |

FOREIGN PATENT DOCUMENTS

| | | |
|---|---|---|
| JP | 2015-158216 A | 9/2015 |
| KR | 10-2015-0006633 A | 1/2015 |
| KR | 10-2019-0097898 A | 8/2019 |
| KR | 10-2036913 B1 | 10/2019 |
| KR | 10-2020-0081639 A | 7/2020 |
| WO | 2017/111817 A1 | 6/2017 |
| WO | 2020/029062 A1 | 2/2020 |
| WO | 2020/246811 A1 | 12/2020 |

OTHER PUBLICATIONS

International Search Report dated Nov. 5, 2021, issued in International Patent Application No. PCT/KR2021/009351.
European Search Report dated Nov. 7, 2023, issued in European Application No. 21847420.3.

[Figure 1]
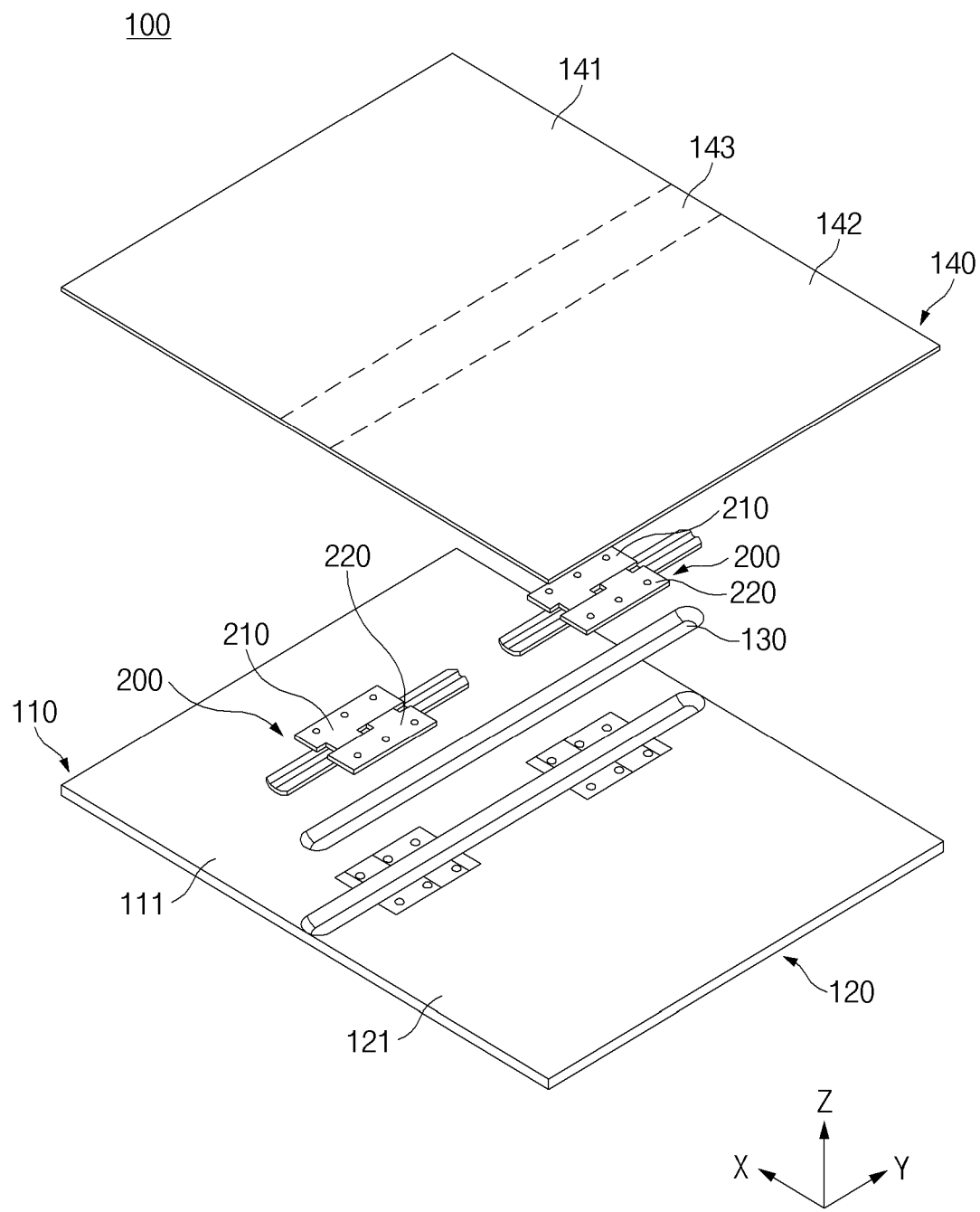

【Figure 2A】
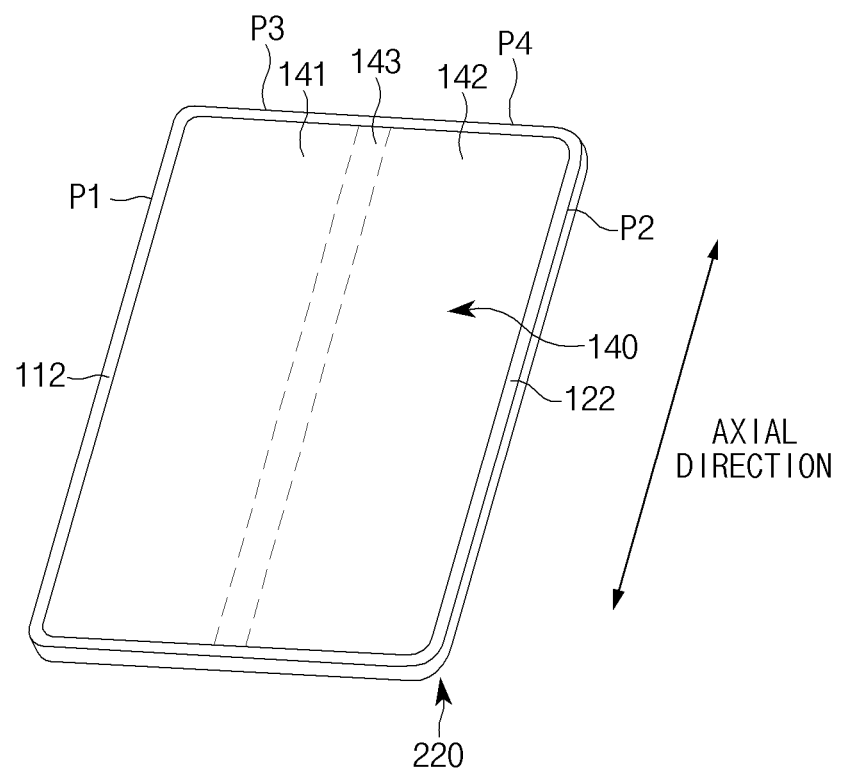
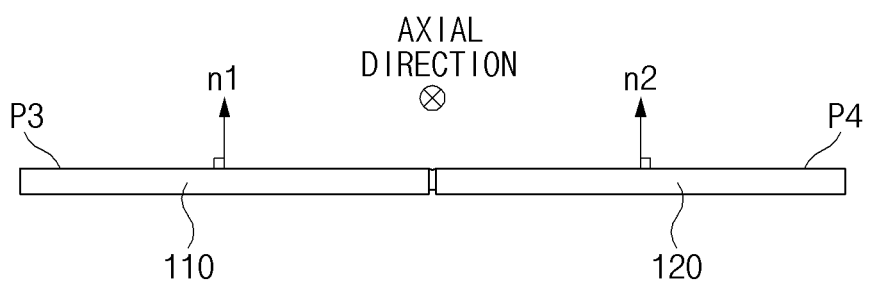

【Figure 2B】
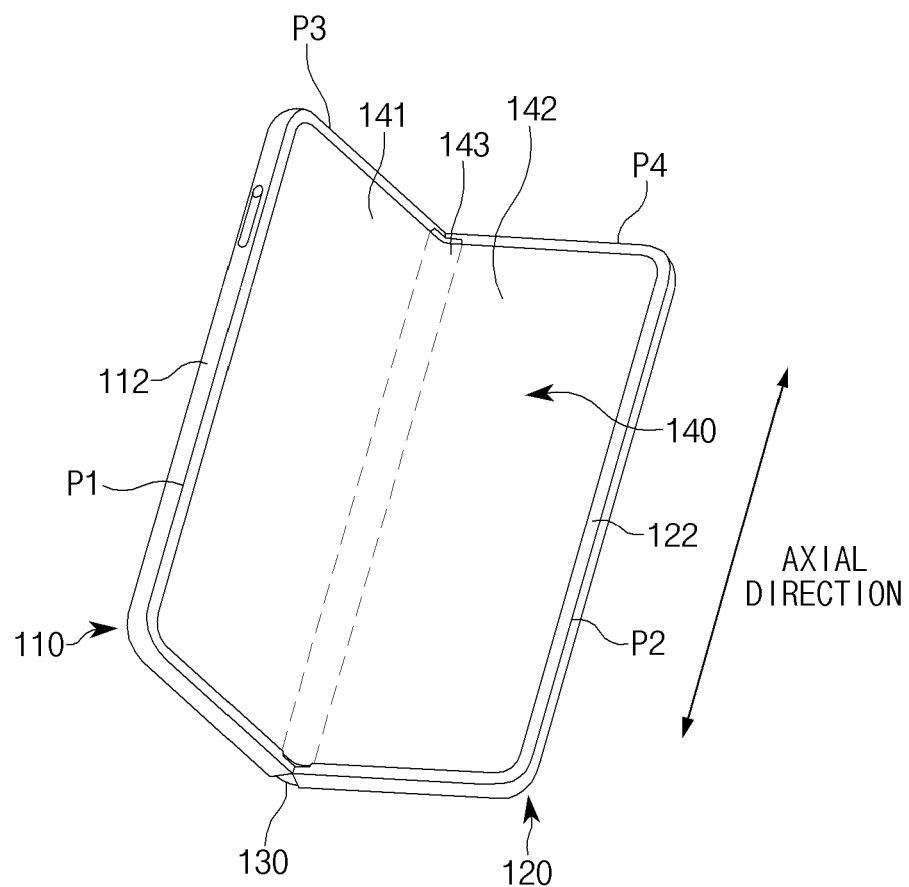
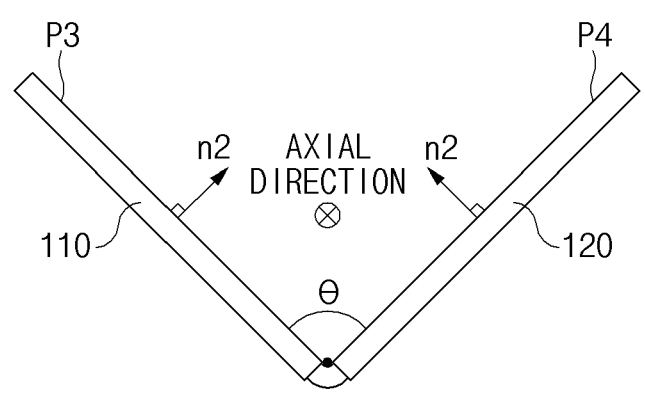

【Figure 2C】
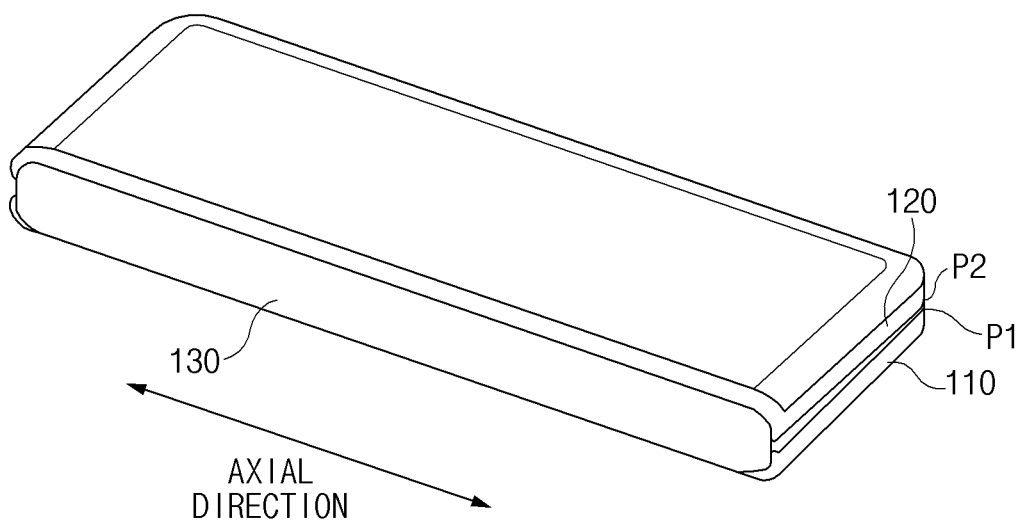
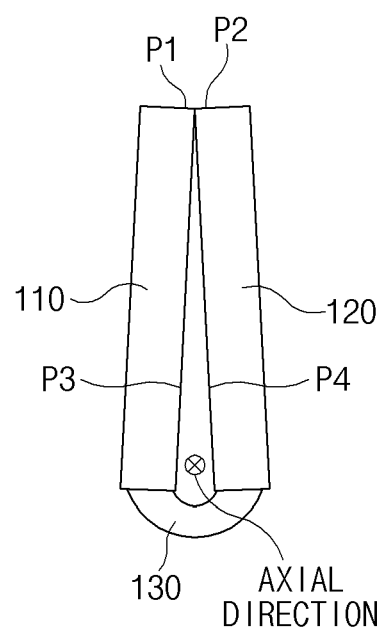

【Figure 3】
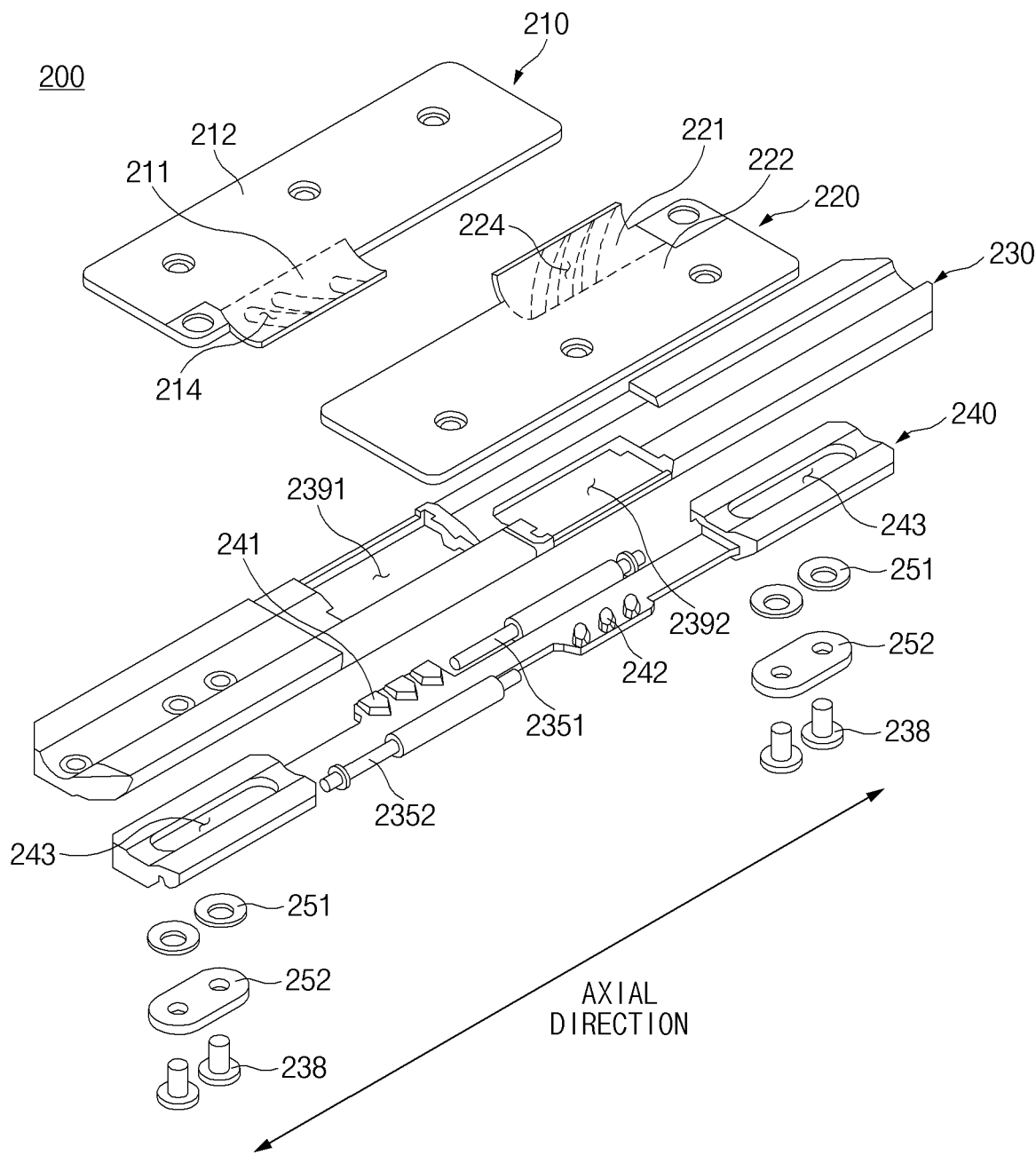

【Figure 4A】
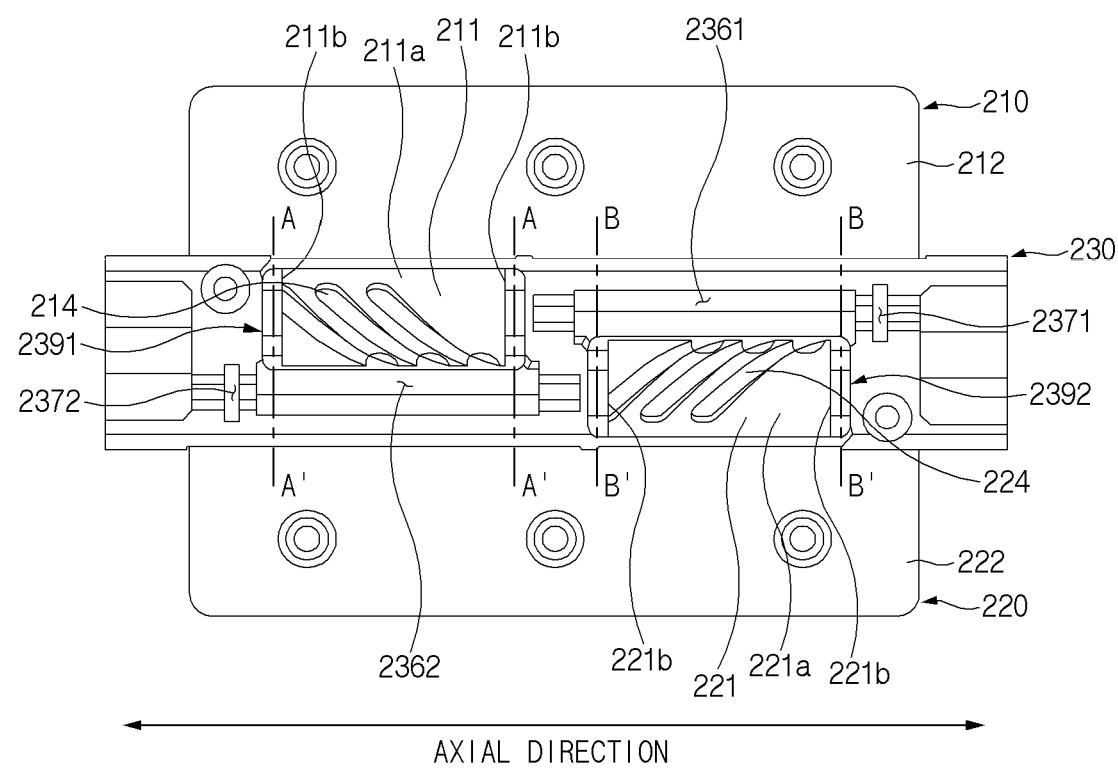
AXIAL DIRECTION

【Figure 4B】
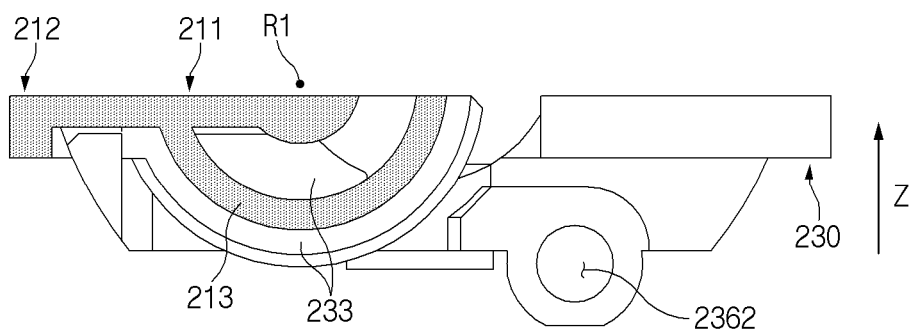
【Figure 4C】
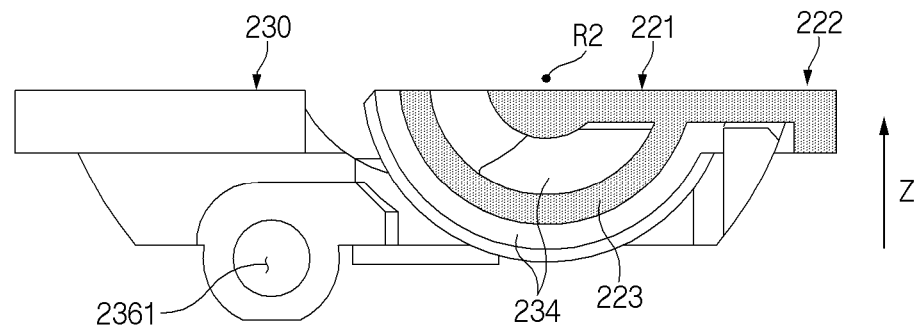

【Figure 5】
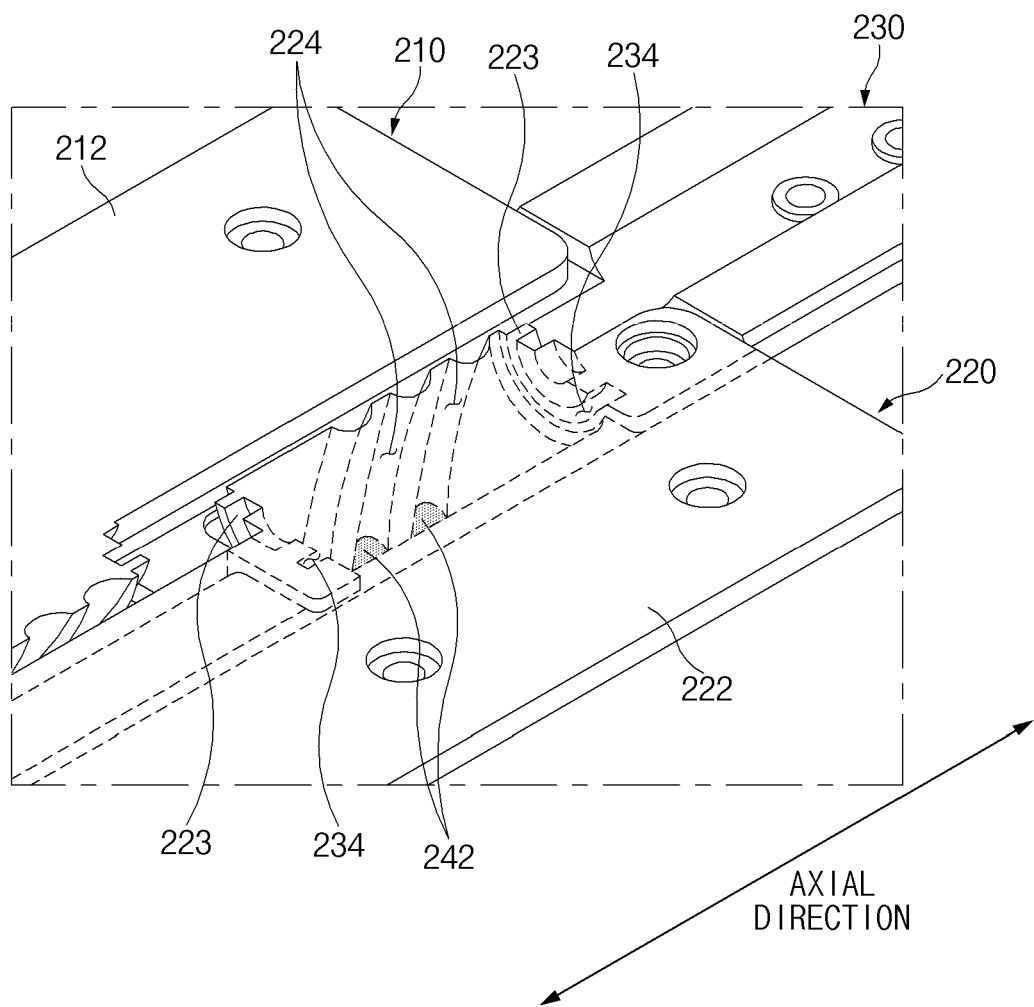

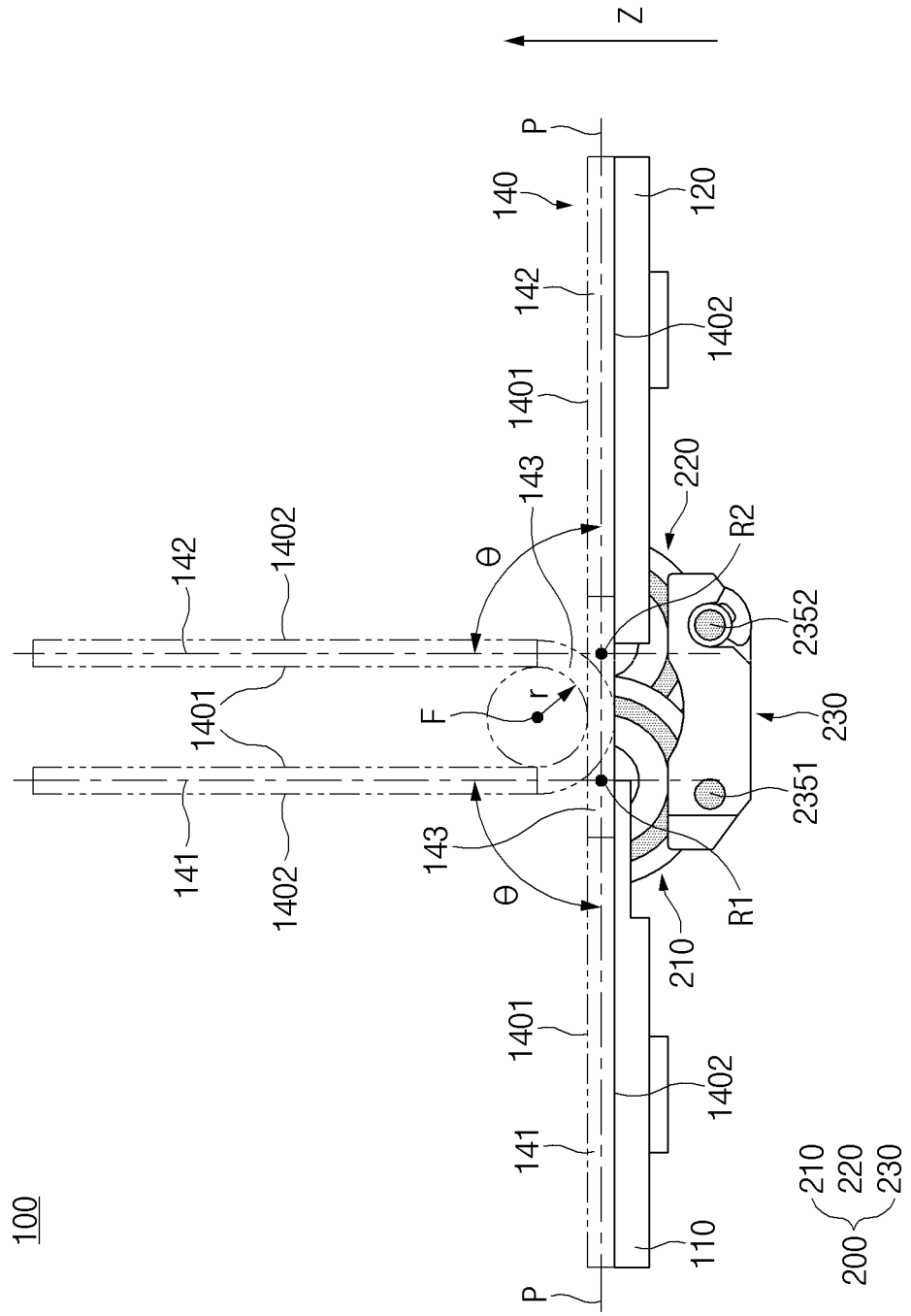
[Figure 6]

[Figure 7]
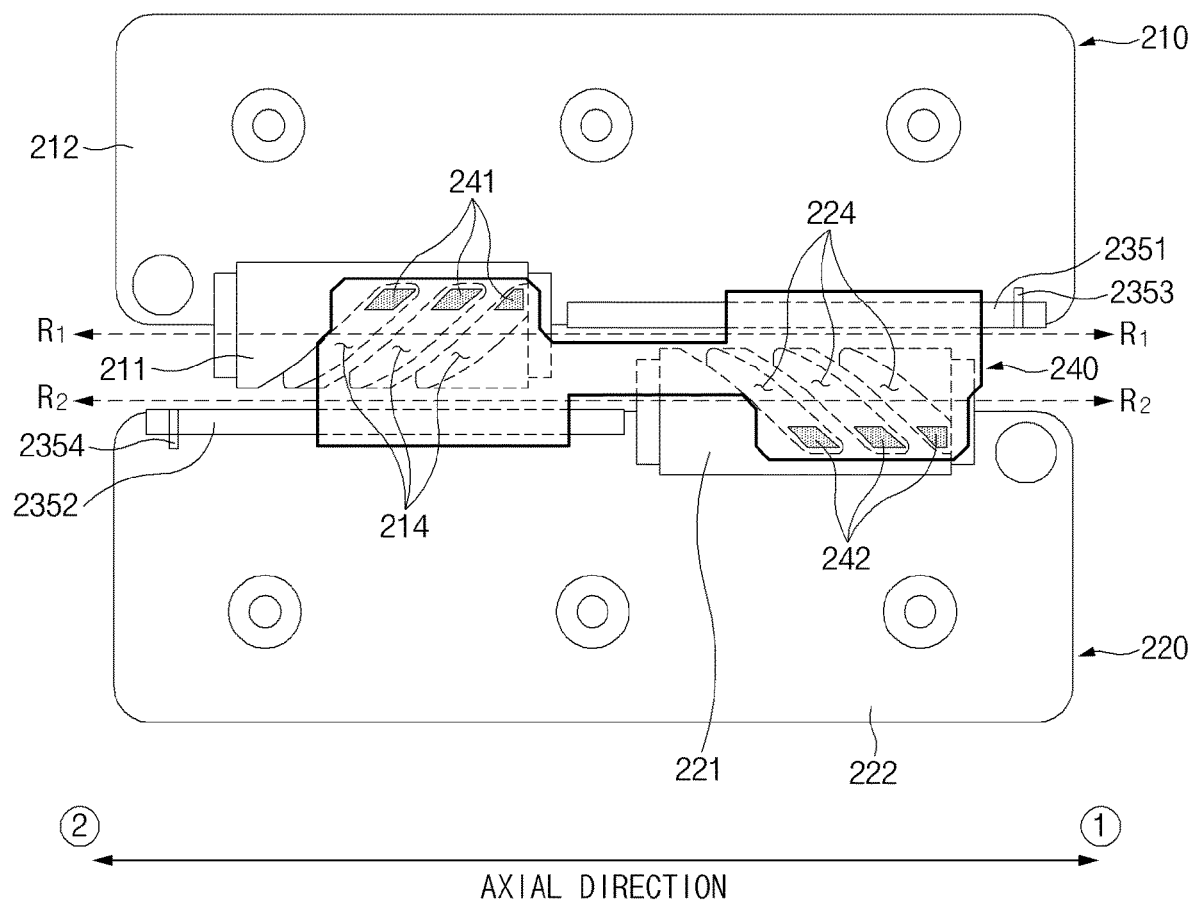

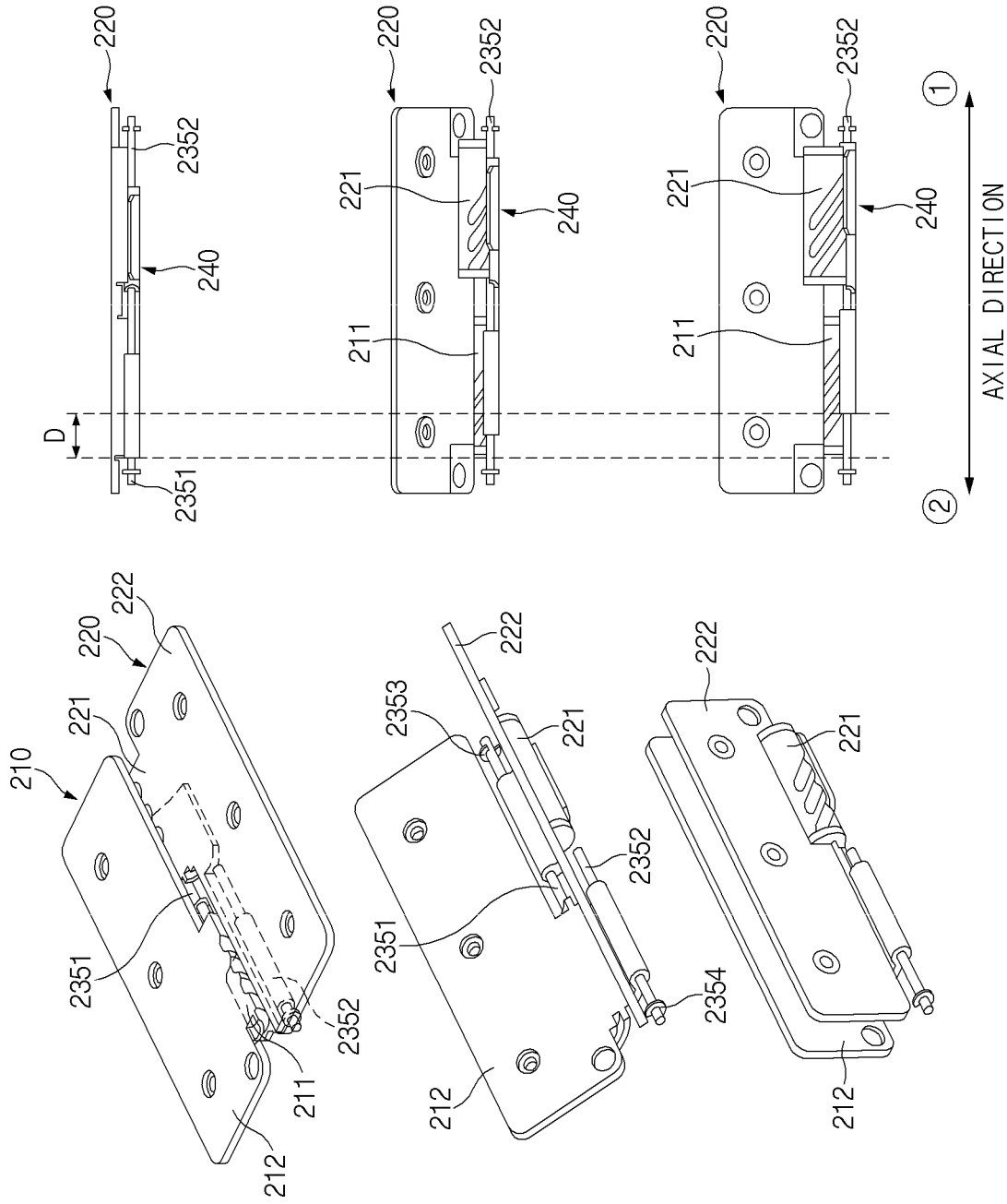
[Figure 8]

【Figure 9A】
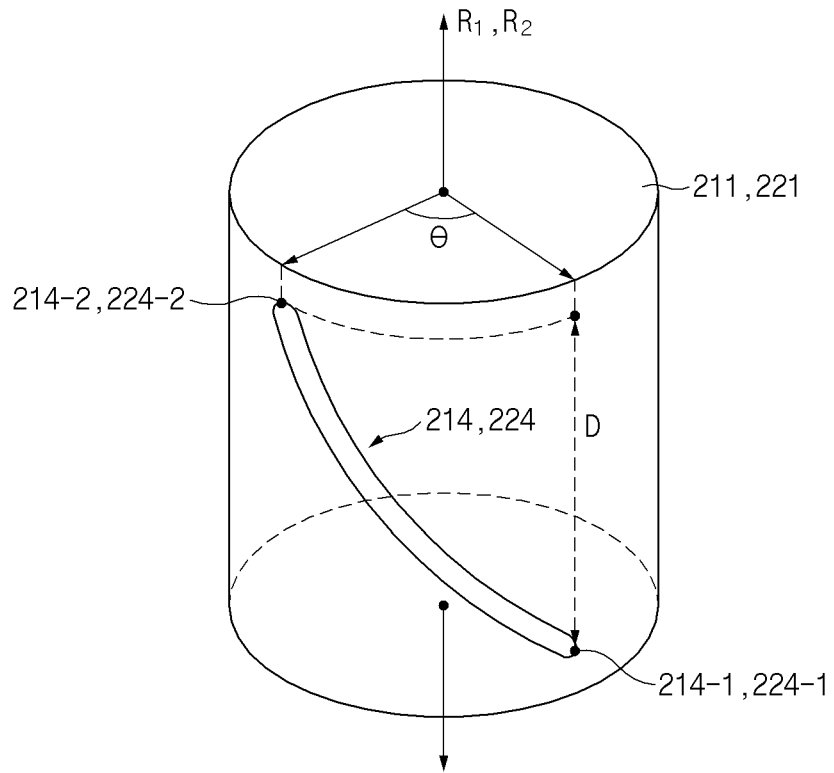
【Figure 9B】
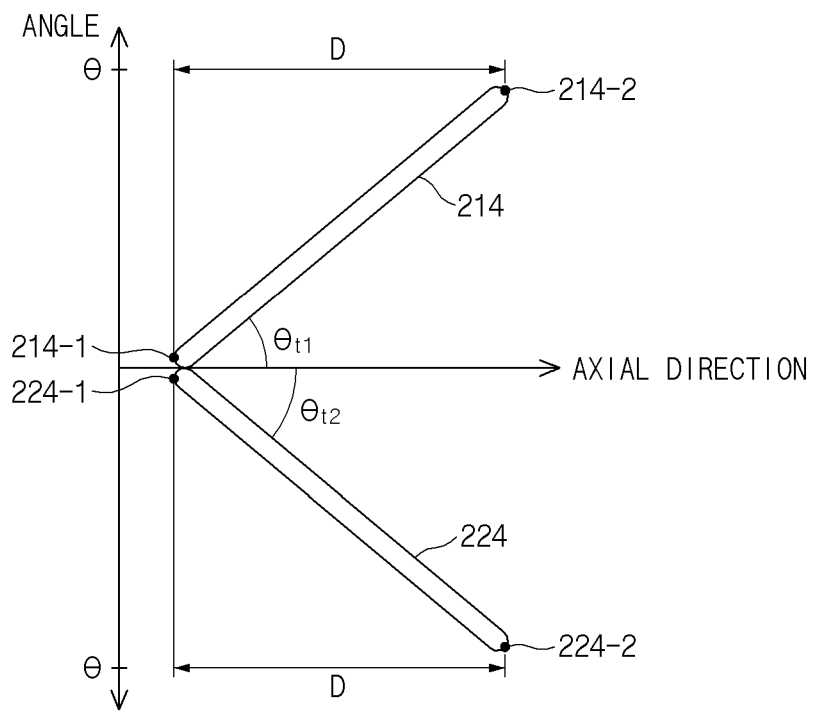

【Figure 10】
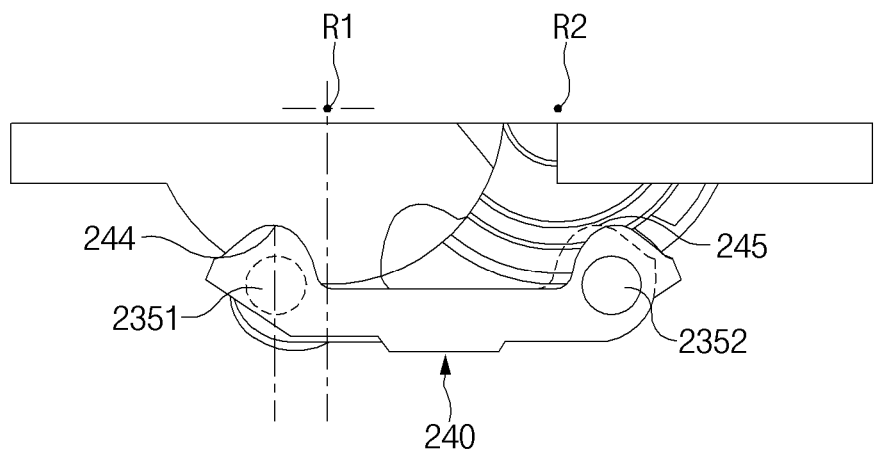
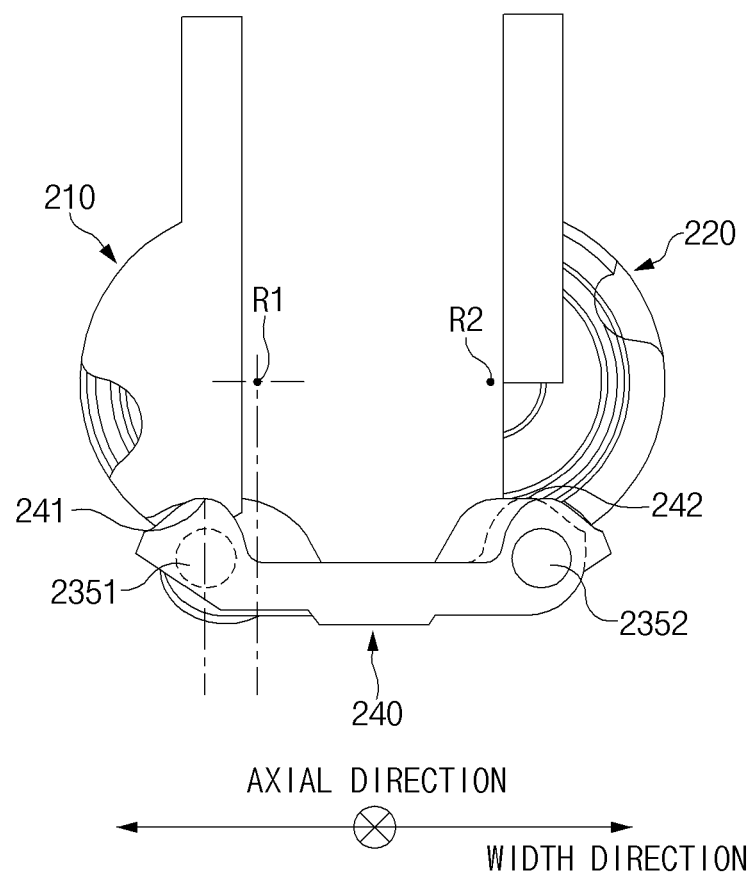
AXIAL DIRECTION
WIDTH DIRECTION

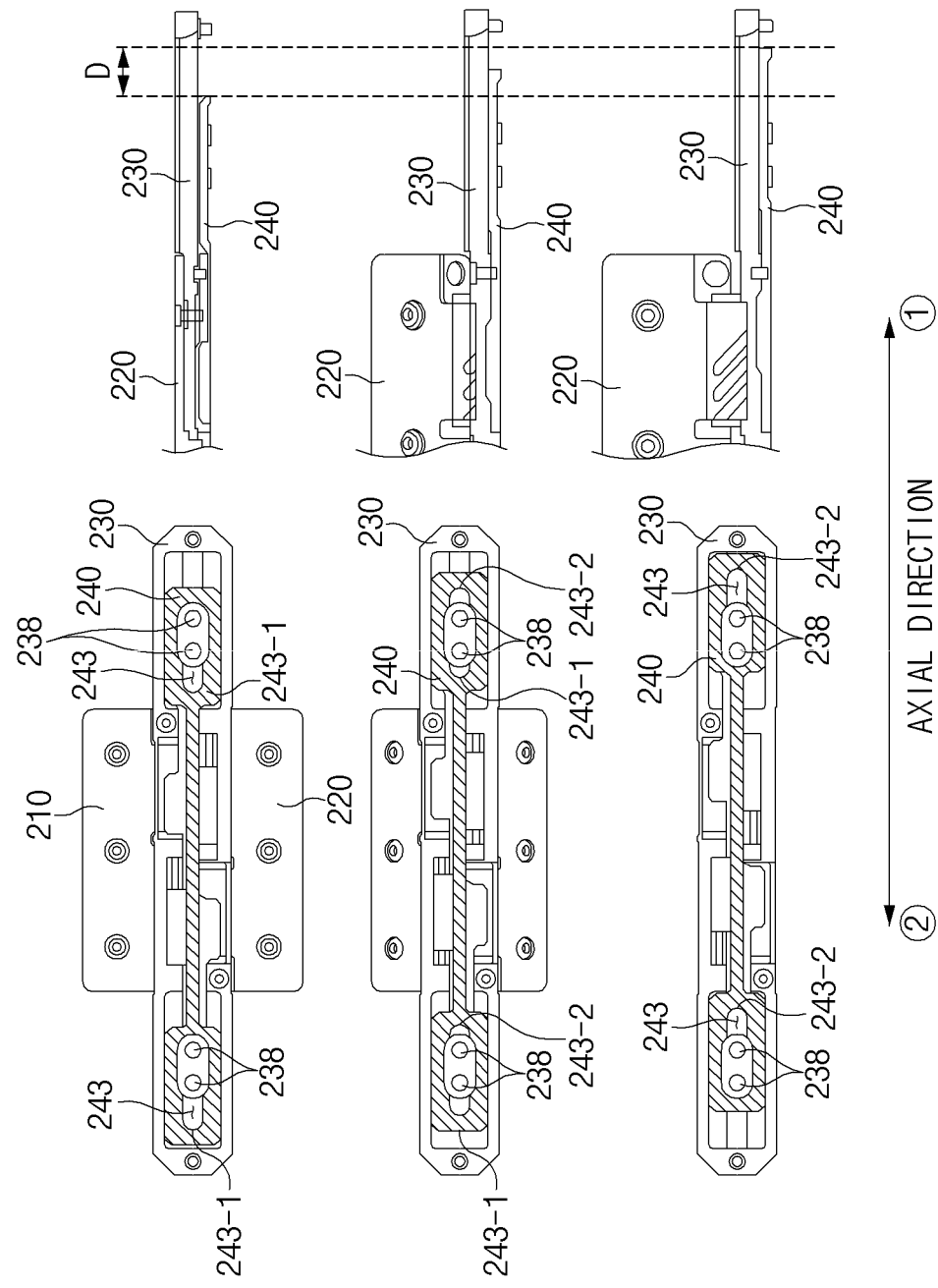
[Figure 11]

[Figure 12]
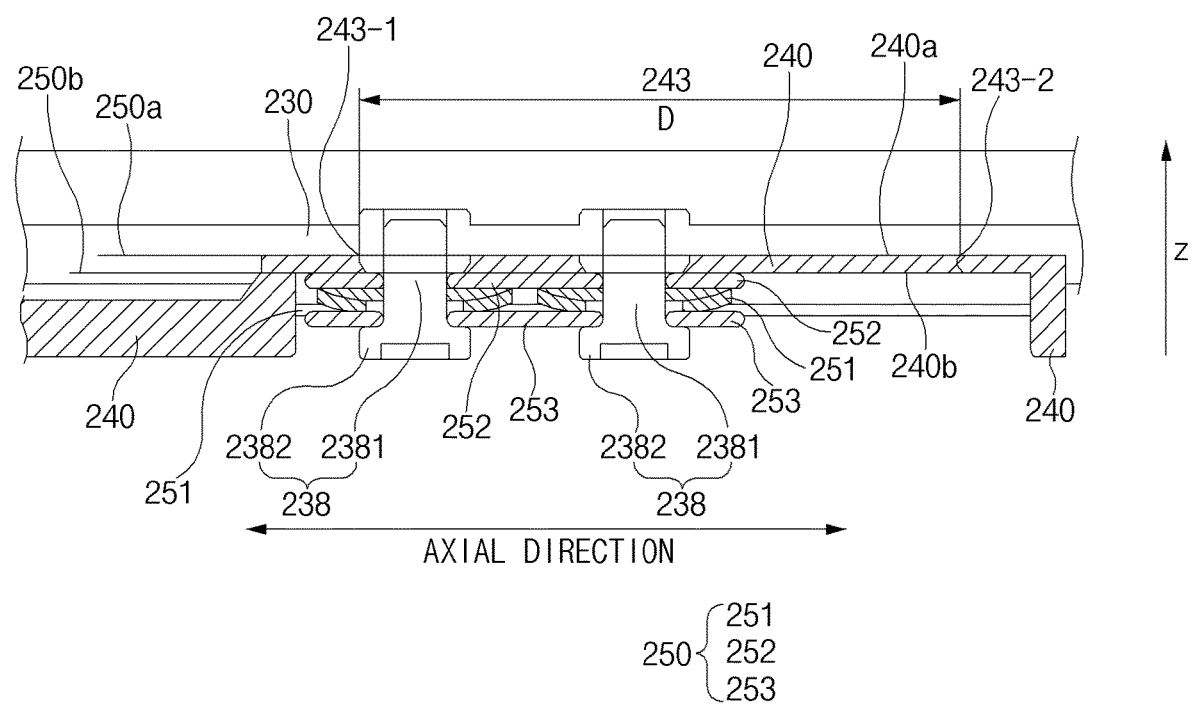

【Figure 13】
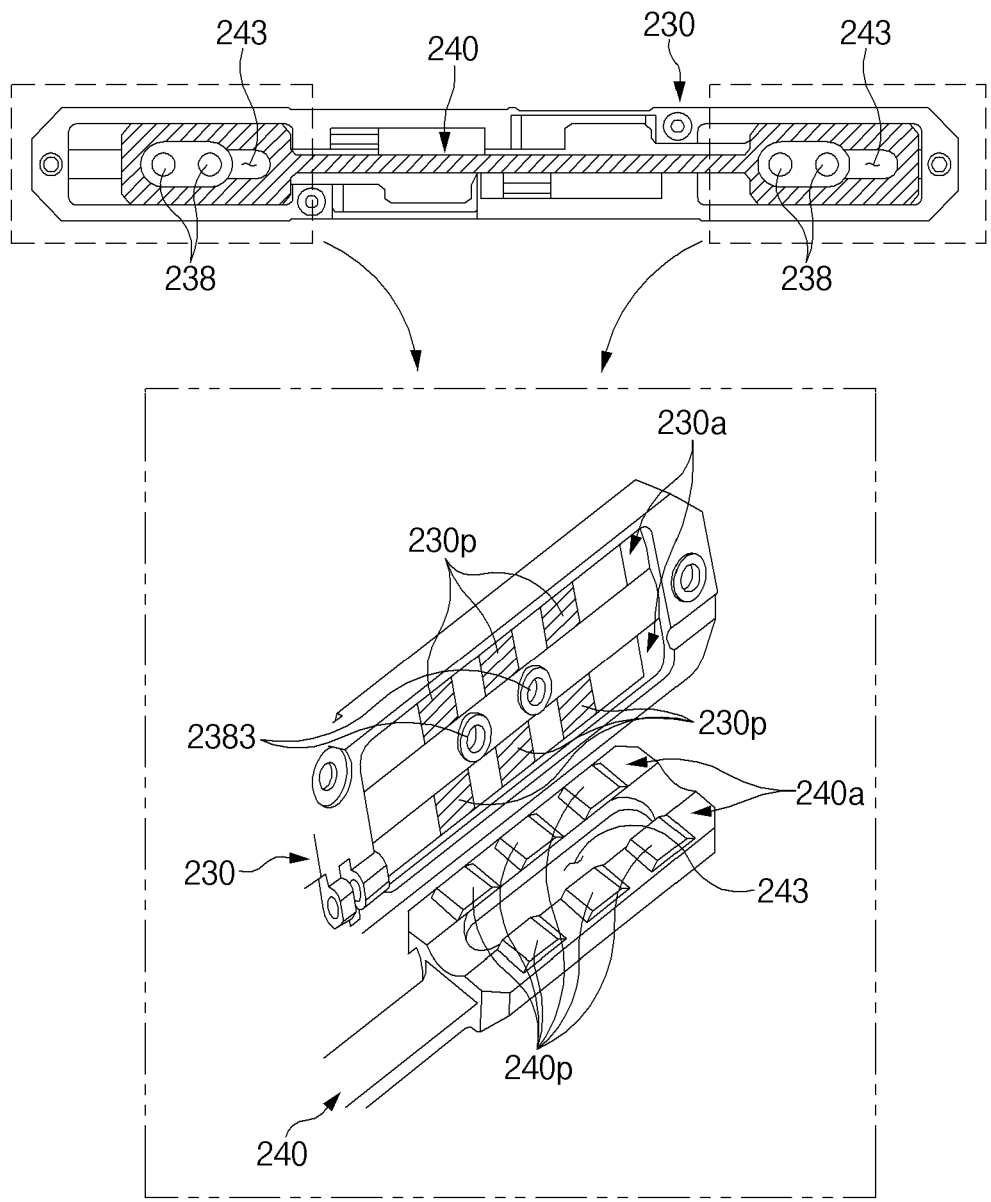

[Figure 14A]
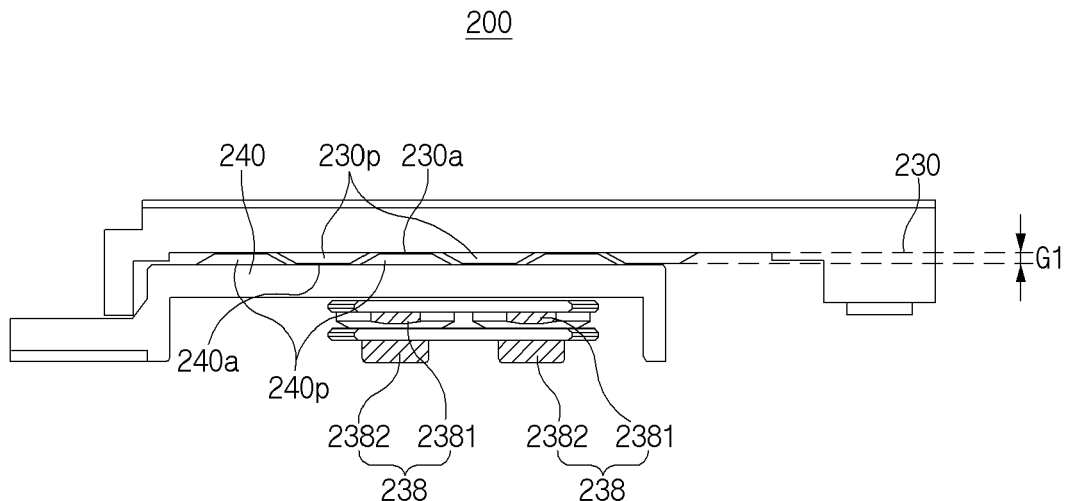
[Figure 14B]
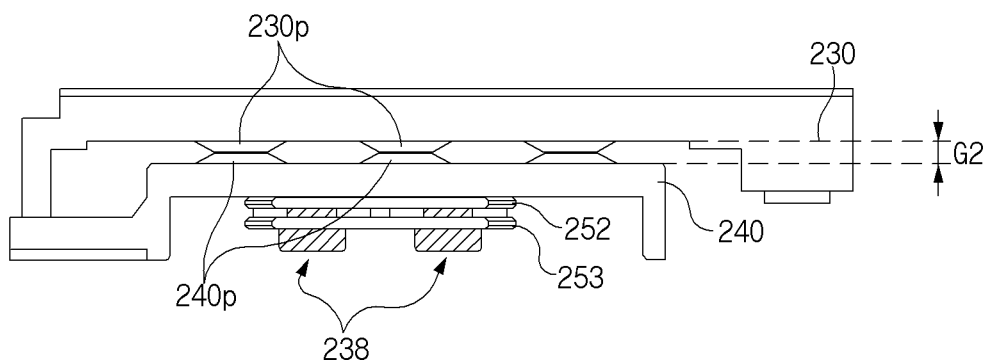
[Figure 14C]
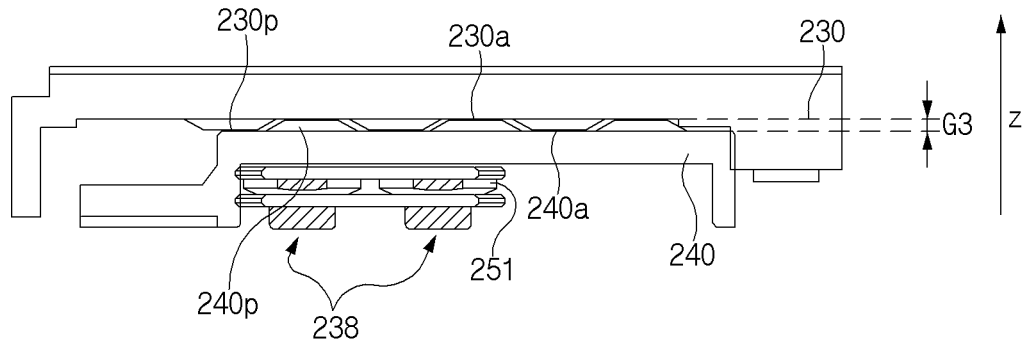

【Figure 15A】
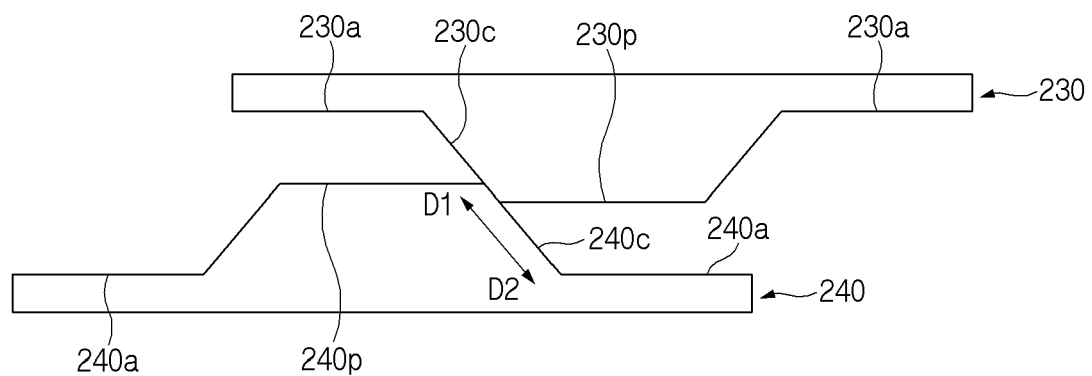
【Figure 15B】
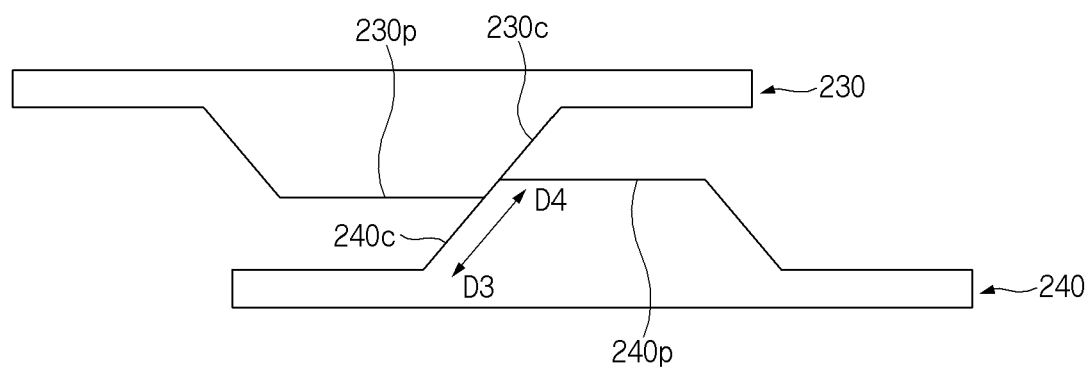

[Figure 16]
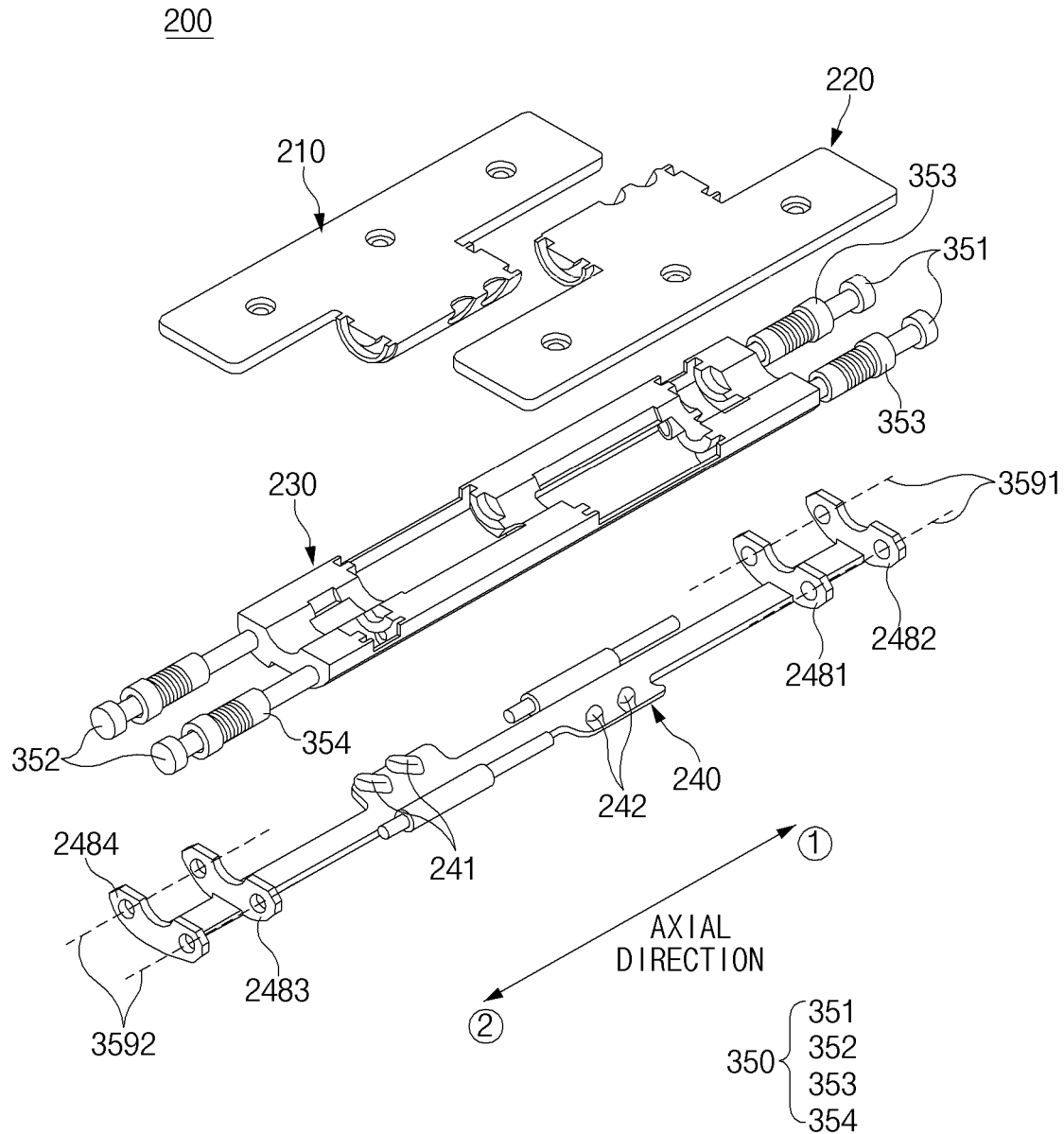

【Figure 17A】
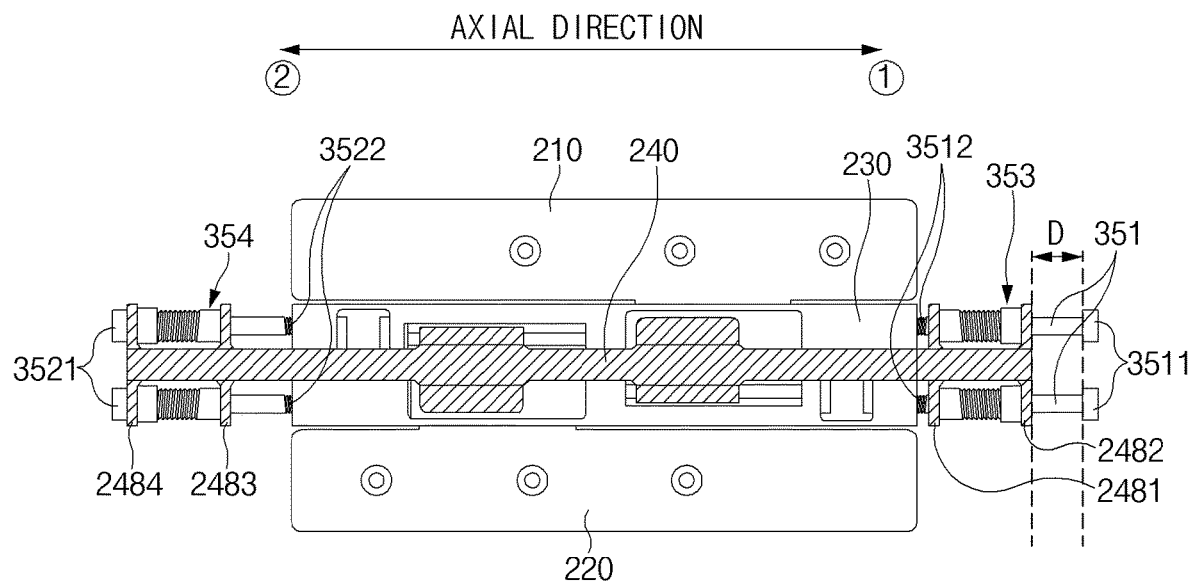
【Figure 17B】
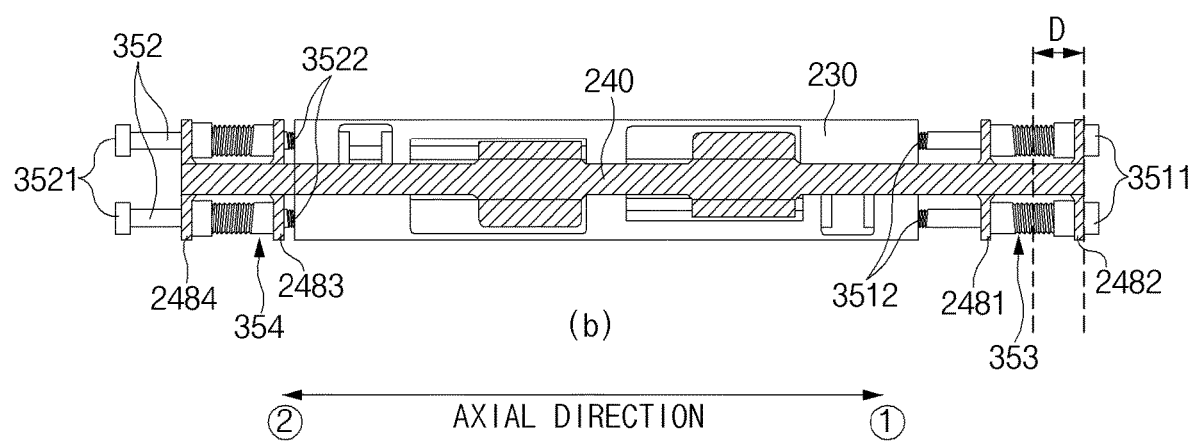

[Figure 18]
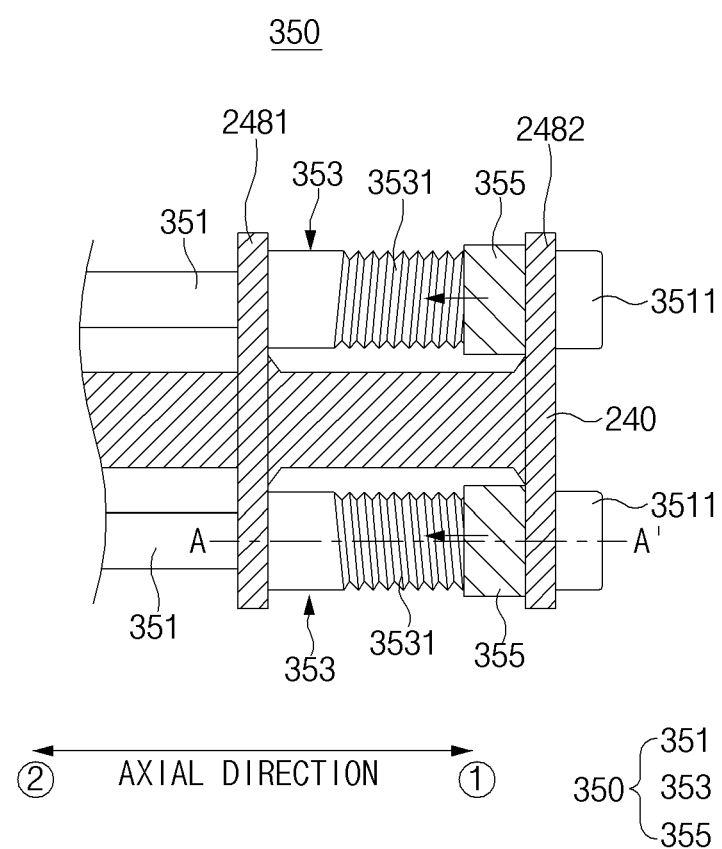

【Figure 19A】
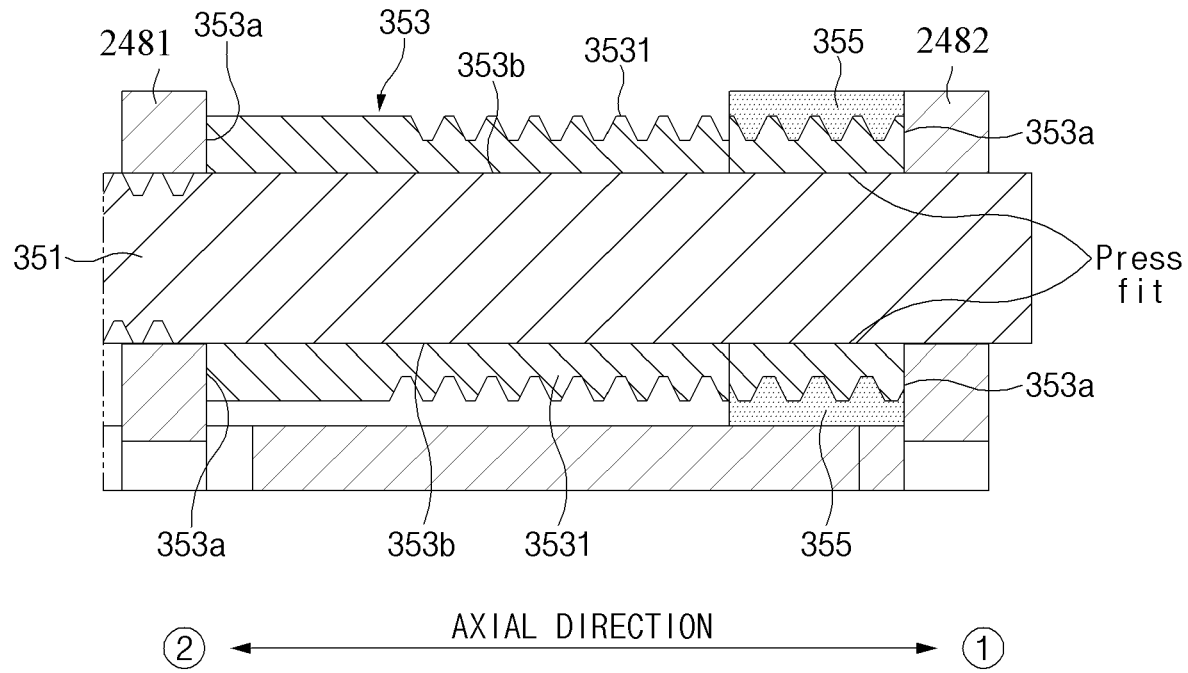
【Figure 19B】
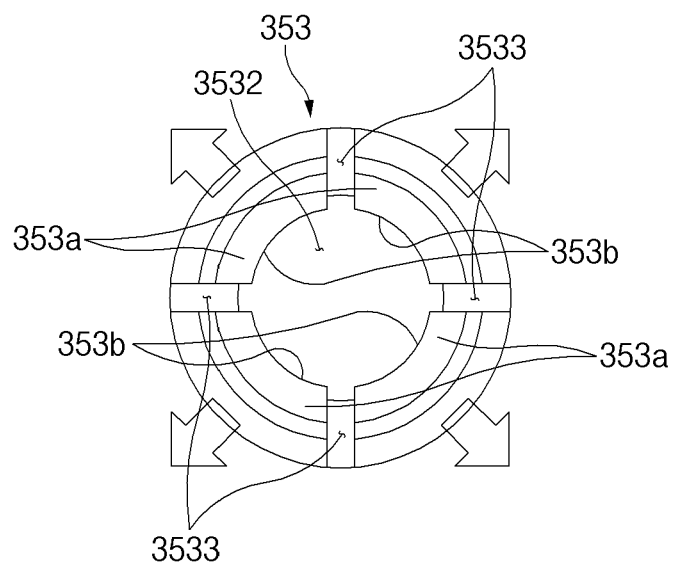

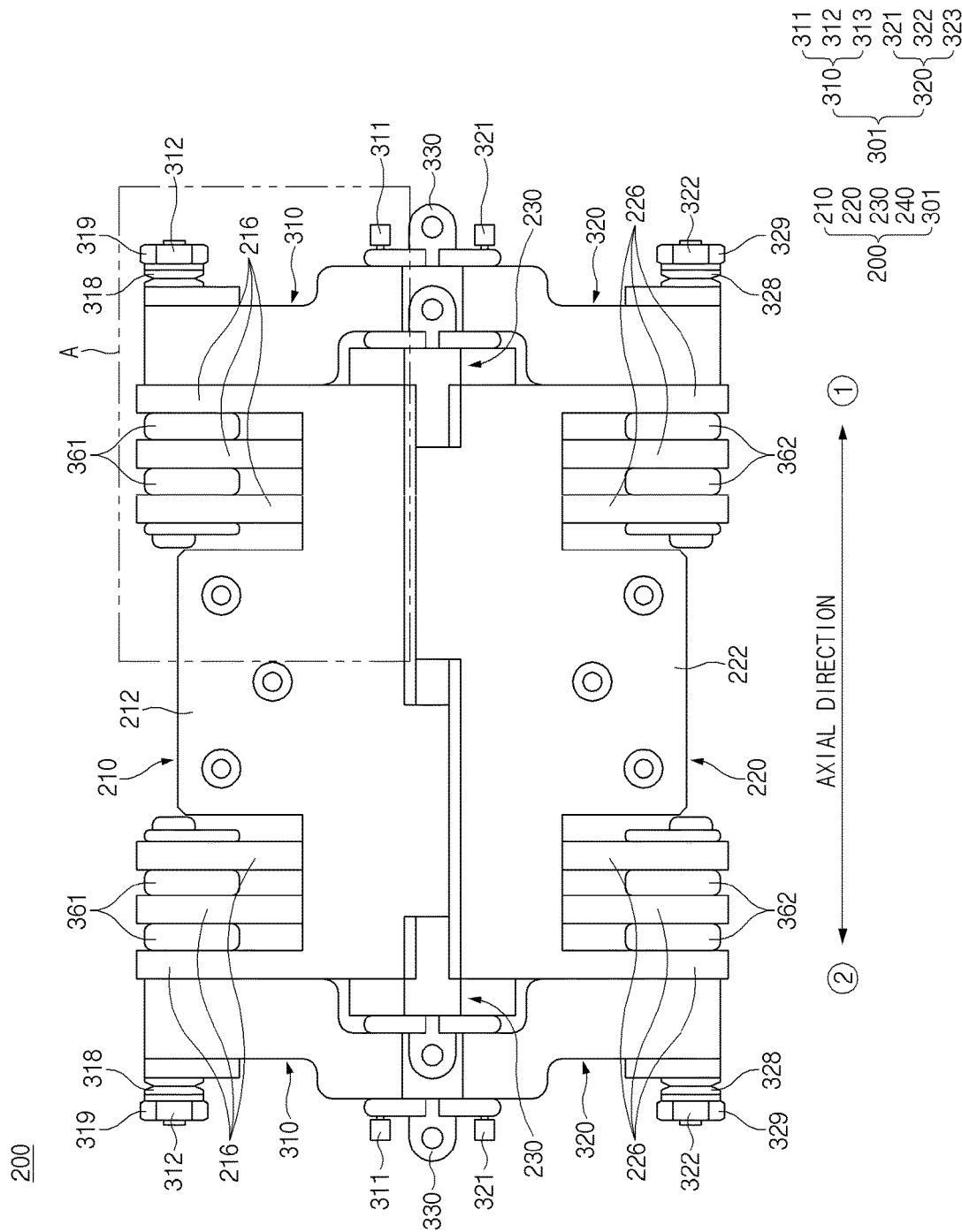
[Figure 20]

[Figure 21]
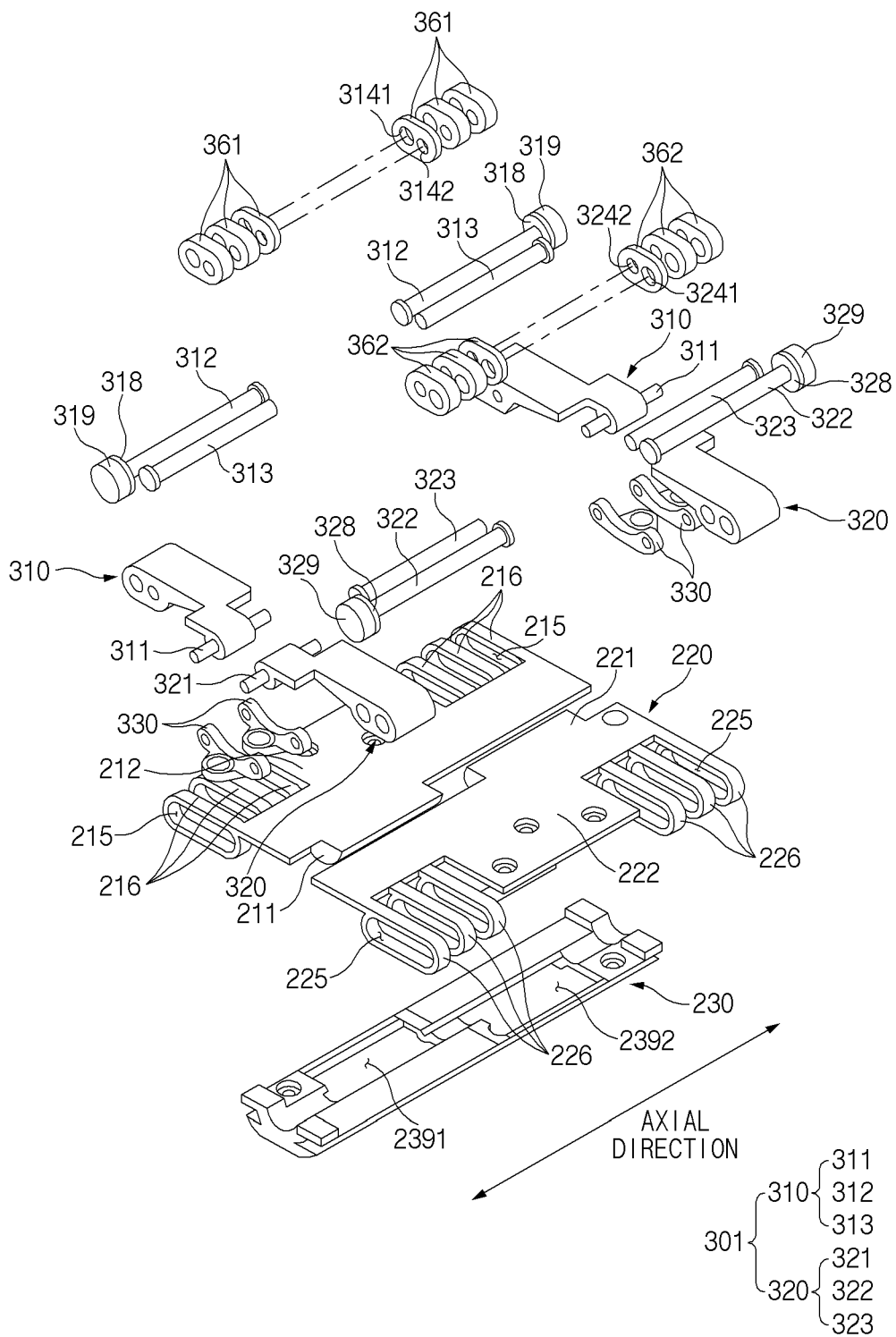

[Figure 22]
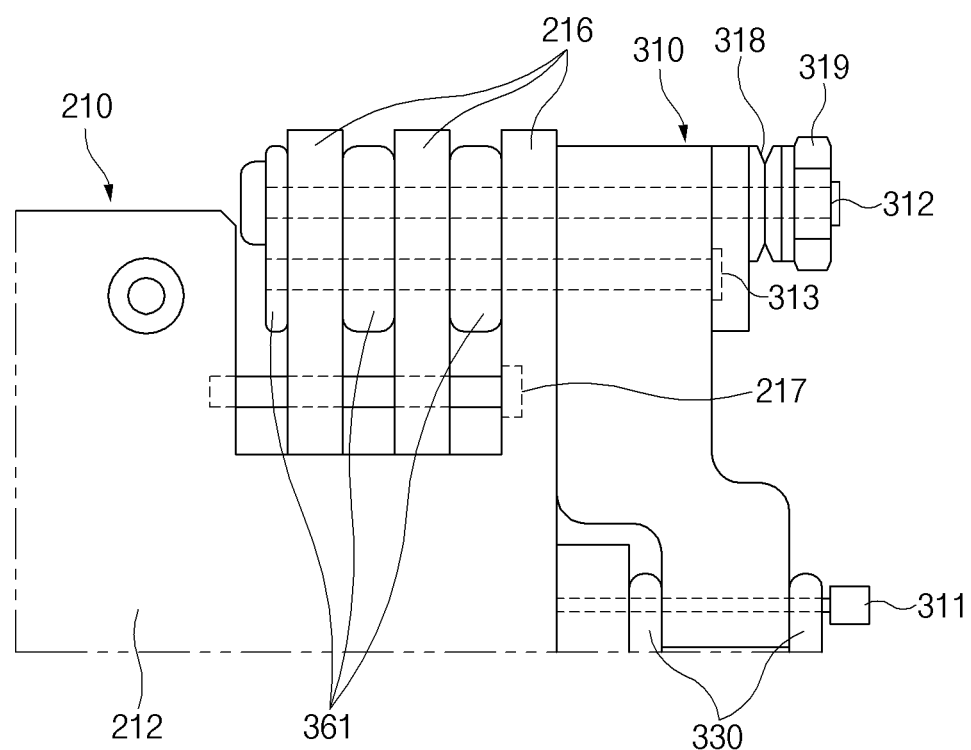

【Figure 23】
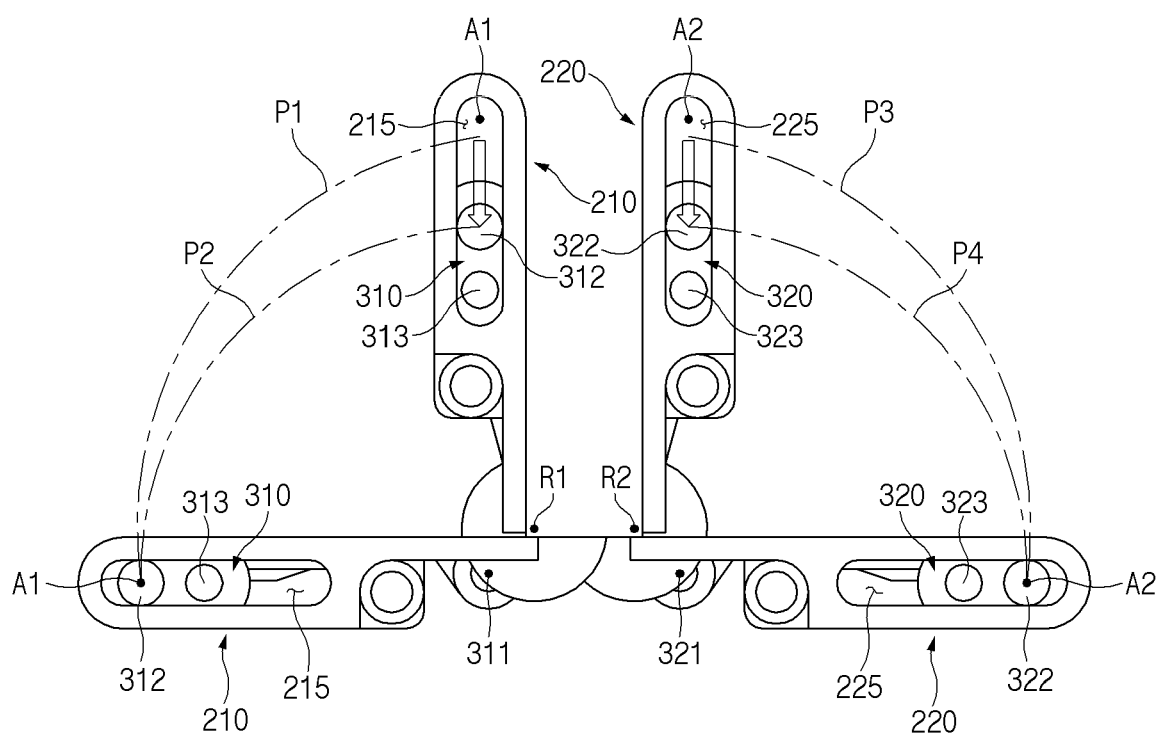

【Figure 24A】
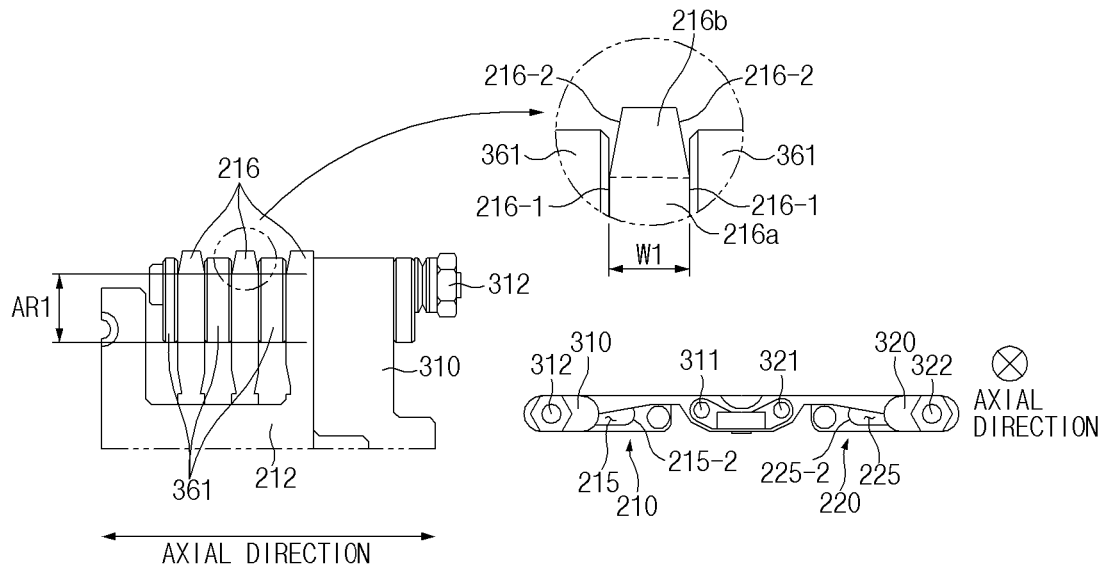
【Figure 24B】
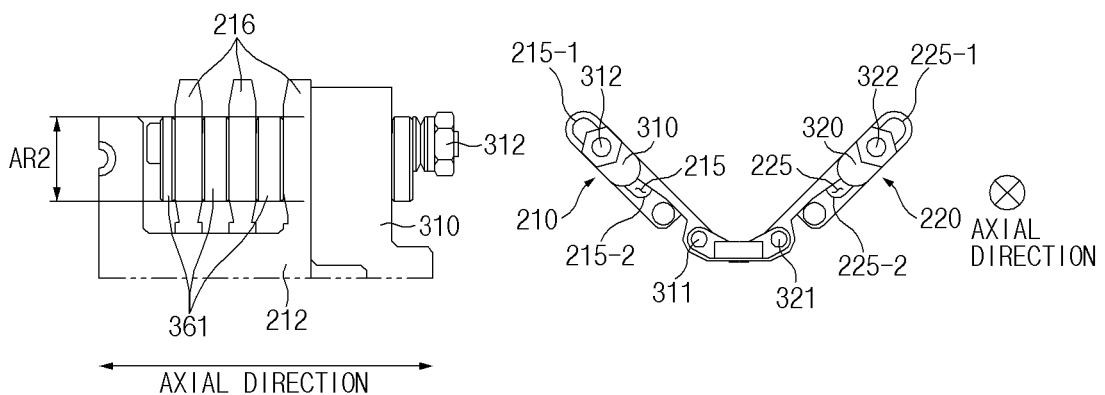

【Figure 24C】
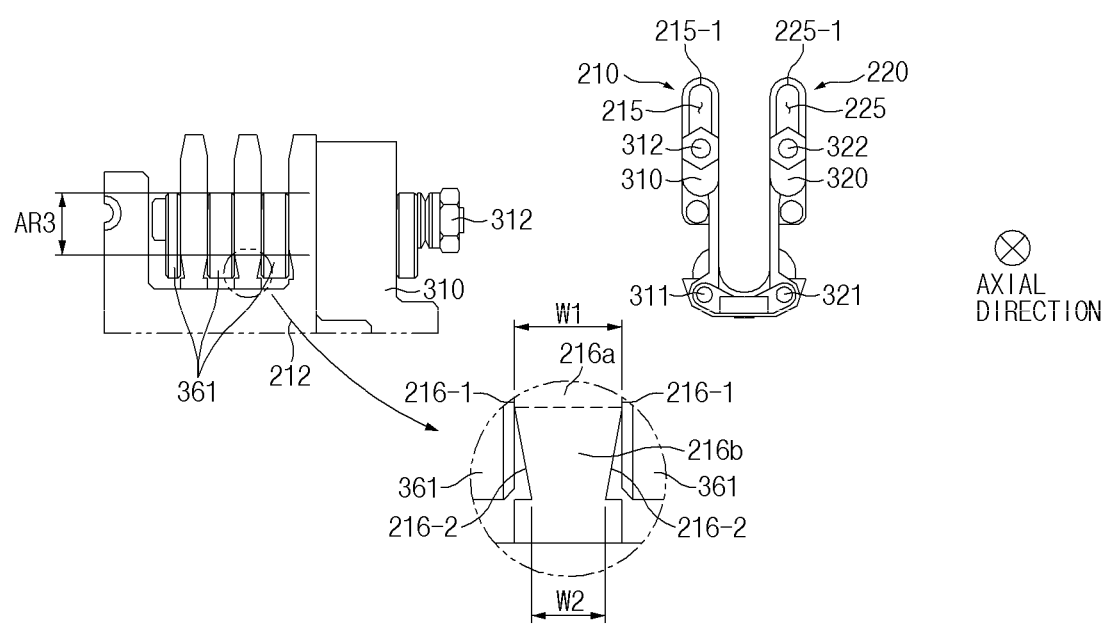

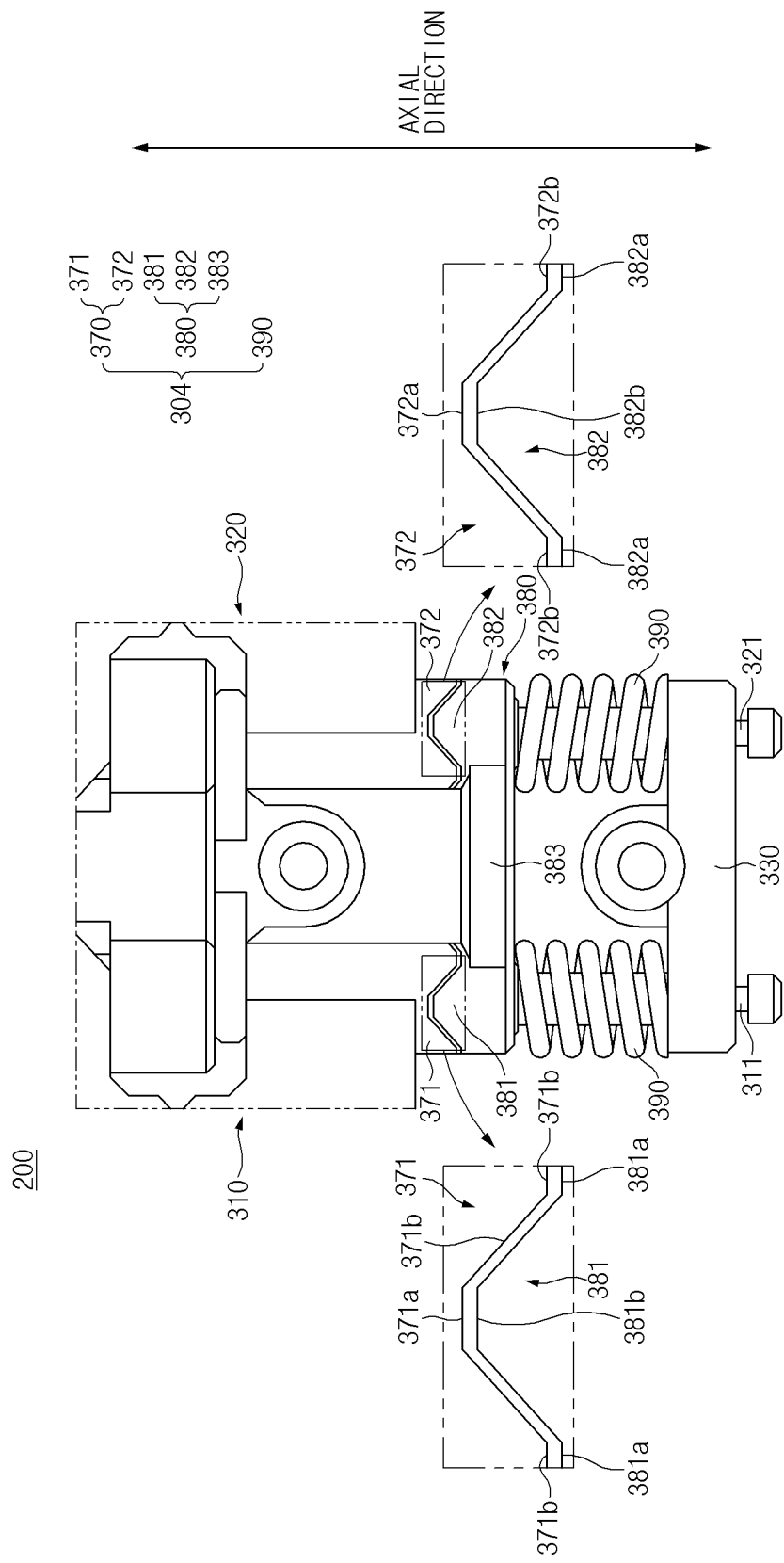
[Figure 25]

【Figure 26A】
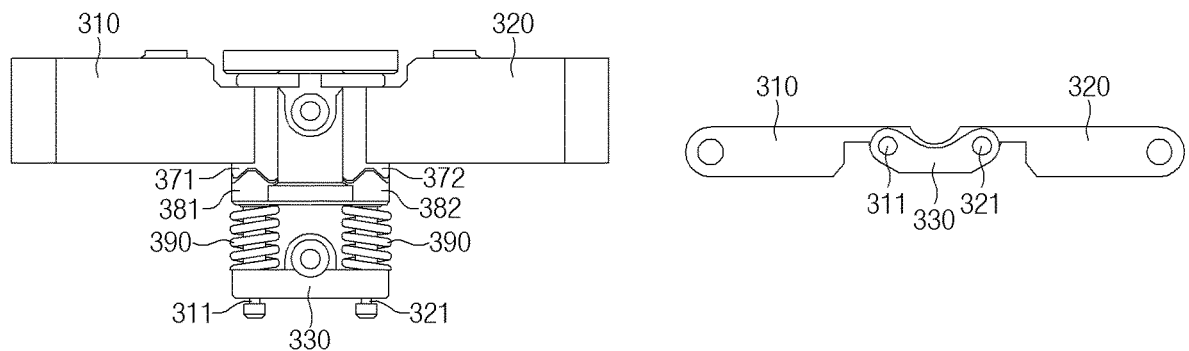
【Figure 26B】
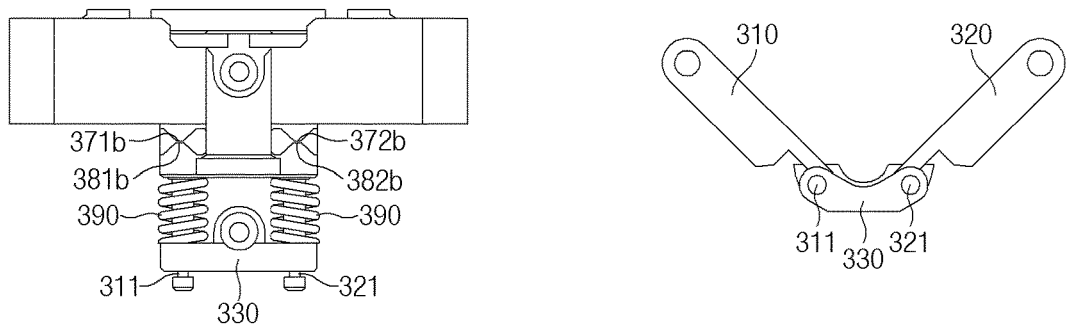
【Figure 26C】
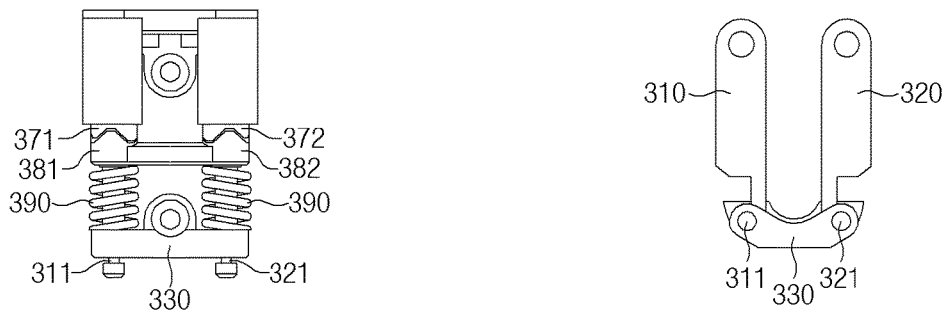

HINGE STRUCTURE AND ELECTRONIC DEVICE INCLUDING THE SAME

CROSS-REFERENCE TO RELATED APPLICATION(S)

This application is a continuation application of prior application Ser. No. 17/425,623, filed on Jul. 23, 2021, which has issued as U.S. Pat. No. 11,788,330 on Oct. 17, 2023, which is a U.S. National Stage application under 35 U.S.C. § 371 of an International application number PCT/KR2021/009351, filed on Jul. 20, 2021, which is based on and claims priority of a Korean patent application number 10-2020-0092496, filed on Jul. 24, 2020, in the Korean Intellectual Property Office, the disclosure of which is incorporated by reference herein in its entirety.

TECHNICAL FIELD

The disclosure relates to a hinge structure and an electronic device including the same.

BACKGROUND ART

A portable electronic device such as a smartphone may provide various functions, such as telephone call, video playback, Internet search, and the like, based on various types of applications. A user may want to use the aforementioned various functions through a wider screen. However, portability may be decreased with an increase in screen size. Accordingly, to provide a wide screen while ensuring portability, a foldable electronic device including a flexible display, a partial area of which is deformable to be curved or flat, is being developed. The foldable electronic device may include a hinge structure to which adjacent housings are rotatably connected.

DISCLOSURE

Technical Problem

A foldable electronic device may include a flexible display, at least a partial area of which is deformable to be curved or flat. With an increase in the size of the flexible display, a restoring force (e.g., a force by which a curved area returns to a flat area) in a folded state may be increased. The restoring force may cause a defect in a folding motion and an unfolding motion of the foldable electronic device. For example, due to the restoring force of the flexible display, the foldable electronic device may not be able to maintain a folded state desired by a user.

Aspects of the disclosure are to address at least the above-mentioned problems and/or disadvantages and to provide at least the advantages described below. Accordingly, an aspect of the disclosure is to provide a hinge structure for providing torque capable of cancelling out a restoring force of a display.

Technical Solution

Additional aspects will be set forth in part in the description which follows and, in part, will be apparent from the description, or may be learned by practice of the presented embodiments.

In accordance with an aspect of the disclosure, a hinge structure is provided. The hinge structure includes a fixed structure including a first guide rail having an arc shape and a second guide rail having an arc shape, in which the center of an arc of the first guide rail is a first axis of rotation parallel to an axial direction and the center of an arc of the second guide rail is a second axis of rotation parallel to the axial direction, a first rotary structure that includes a first guide portion accommodated in the first guide rail and a first helical groove extending around and along the first axis of rotation and that rotates about the first axis of rotation, a second rotary structure that includes a second guide portion accommodated in the second guide rail and a second helical groove extending around and along the second axis of rotation and that rotates about the second axis of rotation, and a sliding structure that includes a first guide protrusion accommodated in the first helical groove and a second guide protrusion accommodated in the second helical groove and that slides in the axial direction relative to the fixed structure as the first rotary structure and the second rotary structure rotate.

Advantageous Effects

The electronic device according to the embodiments of the disclosure may include the hinge structure that provides torque greater than or equal to the restoring force of the display. Accordingly, a folding motion of the foldable electronic device or a folded state desired by a user may be stably maintained.

Furthermore, the hinge structures according to the embodiments of the disclosure may provide torque sufficient to cancel out the restoring force of the display without an increase in the thickness of the electronic device.

In addition, the disclosure may provide various effects that are directly or indirectly recognized.

DESCRIPTION OF DRAWINGS

The above and other aspects, features, and advantages of certain embodiments of the disclosure will be more apparent from the following description taken in conjunction with the accompanying drawings, in which:

FIG. 1 is an exploded perspective view of an electronic device according to an embodiment of the disclosure;

FIG. 2A is a view illustrating an unfolded state of the electronic device according to an embodiment of the disclosure;

FIG. 2B is a view illustrating a folded state of the electronic device according to an embodiment of the disclosure;

FIG. 2C is a view illustrating a fully folded state of the electronic device according to an embodiment of the disclosure;

FIG. 3 is a view illustrating a hinge structure according to an embodiment of the disclosure;

FIGS. 4A, 4B, and 4C are views illustrating a fixed structure and rotary structures of a hinge structure according to various embodiments of the disclosure;

FIG. 5 is a view illustrating a fixed structure and rotary structures of a hinge structure according to an embodiment of the disclosure;

FIG. 6 is a view illustrating axes of rotation of rotary structures of a hinge structure and a folding axis of a display according to an embodiment of the disclosure;

FIG. 7 is a view illustrating rotary structures and a sliding structure of a hinge structure according to an embodiment of the disclosure;

FIG. 8 is a view illustrating rotary structures and a sliding structure of a hinge structure according to an embodiment of the disclosure;

FIGS. 9A and 9B are views illustrating helical grooves of rotary structures of a hinge structure according to various embodiments of the disclosure;

FIG. 10 is a view illustrating sliding shafts and axes of rotation of a hinge structure according to an embodiment of the disclosure;

FIG. 11 is a view illustrating a sliding motion of a sliding structure of a hinge structure according to an embodiment of the disclosure;

FIG. 12 is a view illustrating a friction structure of a hinge structure according to an embodiment of the disclosure;

FIG. 13 is a view illustrating a friction structure of a hinge structure according to an embodiment of the disclosure;

FIGS. 14A, 14B, and 14C are views illustrating a friction structure of a hinge structure according to various embodiments of the disclosure;

FIGS. 15A and 15B are views illustrating a sliding structure and a fixed structure of a hinge structure according to various embodiments of the disclosure;

FIG. 16 is a view illustrating a hinge structure according to an embodiment of the disclosure;

FIGS. 17A and 17B is a view illustrating a second friction structure of a hinge structure according to an embodiment of the disclosure;

FIG. 18 is a view illustrating a shaft tightening member of a hinge structure according to an embodiment of the disclosure;

FIGS. 19A and 19B are views illustrating a shaft tightening member of a hinge structure according to various embodiments of the disclosure;

FIG. 20 is a view illustrating a hinge structure according to an embodiment of the disclosure;

FIG. 21 is an exploded perspective view illustrating a hinge structure according to an embodiment of the disclosure;

FIG. 22 is a view illustrating a third friction structure of a hinge structure according to an embodiment of the disclosure;

FIG. 23 is a view illustrating a folding motion of a hinge structure according to an embodiment of the disclosure;

FIGS. 24A, 24B, and 24C are views illustrating a third friction structure of a hinge structure according to various embodiments of the disclosure;

FIG. 25 is a view illustrating part of a hinge structure according to an embodiment of the disclosure; and FIGS. 26A, 26B, and 26C are views illustrating a fourth friction structure of a hinge structure according to various embodiments of the disclosure.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is an exploded perspective view of an electronic device according to an embodiment of the disclosure.

Referring to FIG. 1, an electronic device 100 may include a first housing 110, a second housing 120, a hinge housing 130, a hinge structure 200, and a display 140.

In an embodiment, the first housing 110 may be connected with the second housing 120 through the hinge structure 200. The first housing 110 may include a first plate 111 on which the display 140 is seated. For example, part of a first area 141 and part of a folding area 143 may be disposed on the first plate 111. A first rotary structure 210 of the hinge structure 200 may be connected to the first plate 111. In an embodiment, at least part of the first housing 110 may be attached to the first area 141 of the display 140. Alternatively, part of a periphery of a front surface of the first housing 110 may be attached to a periphery of the first area 141 of the display 140. In this regard, an adhesive layer may be disposed between the first plate 111 of the first housing 110 and the first area 141 of the display 140.

In various embodiments, the electronic device 100 may further include a lattice structure (not illustrated) and/or a bracket (not illustrated) disposed between the display 140 and the adhesive layer. The lattice structure may include a slit area including a plurality of slits at least partially overlapping the folding area 143. The plurality of slits may extend in the extension direction (e.g., the Y-axis direction) of the folding area 143. The plurality of slits may support the folding area 143 that is flat in an unfolded state (e.g., FIG. 2A) and may support deformation of the folding area 143 in a folding motion or an unfolding motion. In various embodiments, only part of the lattice structure or the bracket may be stacked on the display 140.

In an embodiment, at least a portion inside the first housing 110 may be provided in a hollow form, and the first housing 110 may have, in the hollow portion thereof, electronic components (e.g., a printed circuit board and components, such as at least one processor, at least one memory, and a battery, which are mounted on the printed circuit board) that are required for driving the electronic device 100. In an embodiment, at least part of the first housing 110 may be formed of a metallic material, or at least part of the first housing 110 may be formed of a non-metallic material. The first housing 110 may be formed of a material having a predetermined stiffness to support at least part of the display 140. In an embodiment, a portion of the first housing 110 that faces the second housing 120 may include a depression, at least part of which has a predetermined curvature such that the hinge housing 130 is disposed therein.

In an embodiment, the second housing 120 may be connected with the first housing 110 through the hinge structure 200. The second housing 120 may include a second plate 121 on which the display 140 is seated. For example, part of a second area 142 and part of the folding area 143 may be disposed on the second plate 121. A second rotary structure 220 of the hinge structure 200 may be connected to the second plate 121. In an embodiment, at least part of the second housing 120 may be attached to the second area 142 of the display 140. Alternatively, part of a periphery of a front surface of the second housing 120 may be attached to a periphery of the second area 142 of the display 140. In this regard, an adhesive layer may be disposed between the second plate 121 of the second housing 120 and the second area 142 of the display 140. In an embodiment, at least a portion inside the second housing 120 may be provided in a hollow form, and the second housing 120 may have, in the hollow portion thereof, electronic components (e.g., a printed circuit board and components, such as at least one processor, at least one memory, and a battery, which are mounted on the printed circuit board) that are required for driving the electronic device 100. In an embodiment, at least part of the second housing 120 may be formed of a metallic material, or at least part of the second housing 120 may be formed of a non-metallic material. The second housing 120 may be formed of a material having a predetermined stiffness to support at least part of the display 140. In an embodiment, a portion of the second housing 120 that faces the first housing 110 may include a depression, at least part of which has a predetermined curvature such that the hinge housing 130 is disposed therein.

In an embodiment, the hinge housing 130 may be disposed in the depression of the first housing 110 and the depression of the second housing 120. The hinge housing 130 may be provided in a form extending in the Y-axis direction as a whole. A boss for fixing the hinge structure 200 may be disposed on a partial area of an inner surface of the hinge housing 130.

In an embodiment, at least part of the display 140 may have flexibility. For example, the display 140 may include the first area 141 disposed on the first housing 110, the second area 142 disposed on the second housing 120, and the folding area 143 located between the first area 141 and the second area 142. In an embodiment, the first area 141 and the second area 142 may be formed to be flat, and the folding area 143 may be deformable to be flat or curved.

In various embodiments, the hinge structure 200 may include the first rotary structure 210 connected to the first housing 110 and the second rotary structure 220 connected to the second housing 120. The hinge structure 200 may be configured such that the first rotary structure 210 and the second rotary structure 220 are rotatable about axes of rotation thereof (e.g., the axes of rotation being parallel to the Y-axis). For example, when the first housing 110 and the second housing 120 are folded or unfolded, the first rotary structure 210 and the second rotary structure 220 may rotate about the axes of rotation thereof.

FIG. 2A is a view illustrating an unfolded state of an electronic device according to an embodiment of the disclosure. FIG. 2B is a view illustrating a folded state of an electronic device according to an embodiment of the disclosure. FIG. 2C is a view illustrating a fully folded state of an electronic device according to an embodiment of the disclosure.

In an embodiment, the first housing 110 and the second housing 120 may rotate in opposite directions about the axes of rotation thereof. For example, in a folding motion performed from an unfolded state, the first housing 110 may rotate in the clockwise direction, and the second housing 120 may rotate in the counterclockwise direction.

In an embodiment, an axial direction parallel to the axes of rotation of the first housing 110 and the second housing 120 may be defined. The axial direction may be defined as the extension direction of the folding area 143 of the display 140. For example, the axial direction may be defined as the direction of long sides of the folding area 143. For example, the axial direction may refer to a direction parallel to the Y-axis in FIG. 1.

To describe states of the electronic device 100 according to embodiments of the disclosure, a first edge P1 of the electronic device 100 and a second edge P2 of the electronic device 100 that are parallel to the axial direction may be defined. To describe the states of the electronic device 100, a third edge P3 of the electronic device 100 and a fourth edge P4 of the electronic device 100 that are perpendicular to the axial direction may be defined. For example, the first edge P1 and the third edge P3 may include part of a first frame 112 of the first housing 110. For example, the second edge P2 and the fourth edge P4 may include part of a second frame 122 of the second housing 120.

Referring to FIG. 2A, an unfolded state of the electronic device 100 will be described.

For example, the unfolded state may include a state in which the folding area 143 of the display 140 is flat. For example, the unfolded state may include a state in which the first area 141 and the second area 142 of the display 140 are formed to be flat surfaces facing the same direction. For example, the unfolded state may include a state in which a first normal vector n1 of the first area 141 of the display 140 and a second normal vector n2 of the second area 142 thereof are parallel to each other. For example, the unfolded state may include a state in which the third edge P3 and the fourth edge P4 form substantially one straight line. For example, the unfolded state may include a state in which the third edge P3 and the fourth edge P4 form an angle of 180 degrees.

Referring to FIG. 2B, a folded state of an electronic device 100 will be described.

For example, the folded state may include a state in which the folding area 143 of the display 140 is curved. For example, the folded state may include a state in which the first normal vector n1 of the first area 141 and the second normal vector n2 of the second area 142 form a predetermined angle rather than 180 degrees. For example, the folded state may include a state in which the third edge P3 and the fourth edge P4 form a predetermined angle rather than 180 degrees.

Referring to FIG. 2C, a fully folded state of the electronic device 100 will be described.

For example, the fully folded state may refer to a state in which the first edge P1 and the second edge P2 substantially make contact with each other, among folded states. For example, the folding area 143 in the fully folded state may be formed to be a curved surface having a greater curvature than the folding area 143 in the folded state.

Referring to FIGS. 2B and 2C, in the folded state and the fully folded state, at least part of the hinge housing 130 may form a surface of the electronic device 100. For example, the hinge housing 130 may be visually exposed between the first housing 110 and the second housing 120.

FIG. 3 is a view illustrating a hinge structure according to an embodiment of the disclosure.

Referring to FIG. 3, a hinge structure 200 may include a fixed structure 230, a first rotary structure 210, a second rotary structure 220, and a sliding structure 240.

At least part of the fixed structure 230 may be fixedly disposed inside a hinge housing (e.g., the hinge housing 130 of FIG. 1). The fixed structure 230 may be formed in a form extending in the axial direction. The first rotary structure 210 may be rotatably coupled to the fixed structure 230. For example, the fixed structure 230 may include a first opening area 2391 to which a first coupling portion 211 of the first rotary structure 210 is coupled. The second rotary structure 220 may be rotatably coupled to the fixed structure 230. For example, the fixed structure 230 may include a second opening area 2392 to which a second coupling portion 221 of the second rotary structure 220 is coupled. The sliding structure 240 may be coupled to the fixed structure 230 so as to be slidable in the axial direction. For example, the fixed structure 230 may include a first sliding shaft 2351 and a second sliding shaft 2352, and the sliding structure 240 may be slidably coupled to the first sliding shaft 2351 and the second sliding shaft 2352. A screw 238 for guiding a sliding range of the sliding structure 240 may be coupled to the fixed structure 230. For example, the sliding structure 240 may slide in a range in which the screw 238 makes contact with opposite end portions (e.g., 243-1 and 243-2 in FIG. 11) of a sliding groove 243. The screw 238 may be coupled to a rear surface of the fixed structure 230, and at least part of the screw 238 may be accommodated in the sliding groove 243 of the sliding structure 240. The sliding structure 240 may slide relative to the fixed structure 230 in the axial direction, with the screw 238 located in the sliding groove 243.

In an embodiment, the first rotary structure 210 may be rotatably coupled to the fixed structure 230 and the sliding structure 240.

In an embodiment, the first rotary structure 210 may be configured to rotate along a predetermined path relative to the fixed structure 230 when a first housing (e.g., the first housing 110 of FIG. 1) is folded or unfolded. In an embodiment, the first rotary structure 210 may include the first coupling portion 211 rotatably coupled to the fixed structure 230 and a first extending portion 212 connected to the first housing 110. The first coupling portion 211 may be connected to the fixed structure 230 such that the first rotary structure 210 rotates along the predetermined path. The first extending portion 212 may be folded or unfolded together with the first housing 110 when the electronic device 100 is folded or unfolded. When the first housing 110 is folded or unfolded, the first extending portion 212 and the first coupling portion 211 may rotate relative to the fixed structure 230 along a predetermined rotational path formed by the first coupling portion 211 and the fixed structure 230.

In an embodiment, the sliding structure 240 may be configured to move in the axial direction when the first rotary structure 210 rotates. In an embodiment, the first coupling portion 211 of the first rotary structure 210 may include at least one first helical groove (e.g., first helical groove 214). The first helical groove 214 may be fastened with a first guide protrusion 241 of the sliding structure 240. The first guide protrusion 241 of the sliding structure 240 may be accommodated in the first helical groove 214. For example, the first helical groove 214 may extend to have a predetermined twist angle with respect to the axial direction. The first guide protrusion 241 may be pressed in the axial direction by the first helical groove 214 when the first rotary structure 210 rotates. For example, the first rotary structure 210 may rotate in a state in which an axial movement is restricted by the first opening area 2391 of the fixed structure 230, and the first helical groove 214 of the first rotary structure 210 may press the first guide protrusion 241 of the sliding structure 240 in the axial direction. Accordingly, the sliding structure 240 may move in the axial direction.

In an embodiment, the second rotary structure 220 may be rotatably coupled to the fixed structure 230 and the sliding structure 240.

In an embodiment, the second rotary structure 220 may be configured to rotate along a predetermined path relative to the fixed structure 230 when a second housing (e.g., the second housing 120 of FIG. 1) is folded or unfolded. In an embodiment, the second rotary structure 220 may include the second coupling portion 221 rotatably coupled to the fixed structure 230 and a second extending portion 222 connected to the second housing 120. The second coupling portion 221 may be connected to the fixed structure 230 such that the second rotary structure 220 rotates along the predetermined path. The second extending portion 222 may be folded or unfolded together with the second housing 120 when the electronic device 100 is folded or unfolded. When the second housing 120 is folded or unfolded, the second extending portion 222 and the second coupling portion 221 may rotate relative to the fixed structure 230 along a predetermined rotational path formed by the second coupling portion 221 and the fixed structure 230.

In an embodiment, the sliding structure 240 may be configured to move in the axial direction when the second rotary structure 220 rotates. In an embodiment, the second coupling portion 221 of the second rotary structure 220 may include at least one second helical groove (e.g., second helical groove 224). The second helical groove 224 may be fastened with a second guide protrusion 242 of the sliding structure 240. The second guide protrusion 242 of the sliding structure 240 may be accommodated in the second helical groove 224. For example, the second helical groove 224 may extend to have a predetermined twist angle with respect to the axial direction. The second guide protrusion 242 may be pressed in the axial direction by the second helical groove 224 when the second rotary structure 220 rotates. For example, the second rotary structure 220 may rotate in a state in which an axial movement is restricted by the second opening area 2392 of the fixed structure 230, and the second helical groove 224 of the second rotary structure 220 may press the second guide protrusion 242 of the sliding structure 240 in the axial direction. Accordingly, the sliding structure 240 may move in the axial direction.

The sliding structure 240 may link rotation of the first rotary structure 210 and rotation of the second rotary structure 220. For example, the sliding structure 240 may link the first rotary structure 210 and the second rotary structure 220 such that the first rotary structure 210 and the second rotary structure 220 rotate in opposite directions. For example, when the first rotary structure 210 rotates in a first rotational direction, the first helical groove 214 may press the first guide protrusion 241 to move the sliding structure to one side along the axial direction. When the sliding structure 240 moves to the one side along the axial direction, the second guide protrusion 242 may press the second helical groove 224 to rotate the second rotary structure 220 in a second rotational direction.

In an embodiment, the sliding structure 240 may move in the axial direction along the first sliding shaft 2351 and the second sliding shaft 2352 fixedly disposed on the fixed structure 230. The first sliding shaft 2351 and the second sliding shaft 2352 may pass through the sliding structure 240 and may guide a sliding path of the sliding structure 240. In an embodiment, the sliding structure 240 may include the sliding groove 243. The screw 238 included in the fixed structure 230 may be disposed in the sliding groove 243. The screw 238 may pass through the sliding groove 243 and may be coupled to the fixed structure 230. An elastic member 251 and a first washer 252 may be coupled to the screw 238. The elastic member 251 and the first washer 252 may slide together with the sliding structure 240.

FIGS. 4A to 4C are views illustrating a fixed structure and rotary structures of a hinge structure according to an embodiment of the disclosure. FIG. 5 is a view illustrating a fixed structure and rotary structures of a hinge structure according to an embodiment of the disclosure.

Referring to FIG. 4A, in an embodiment, the fixed structure 230 may include a first guide rail 233 for guiding a rotational path of the first rotary structure 210. The first guide rail 233 may be formed on a sidewall of the first opening area 2391 in which the first rotary structure 210 is accommodated. For example, the first guide rail 233 may be formed on at least one of opposite sidewalls of the first opening area 2391. In an embodiment, the first guide rail 233 may have a substantially arc shape. For example, the center of an arc of the first guide rail 233 may form a first axis of rotation R1. Referring to the drawings, the first axis of rotation R1 may be formed in a position spaced apart from the fixed structure 230 and the first rotary structure 210 in the Z-axis direction. In an embodiment, a first guide portion 213 of the first rotary structure 210 may be accommodated in the first guide rail 233.

In an embodiment, the first rotary structure 210 may include the first guide portion 213 formed on the first coupling portion 211. The first guide portion 213, together with the first guide rail 233, may guide the rotational path of the first rotary structure 210. In an embodiment, the first guide portion 213 may protrude from the first coupling portion 211 in the axial direction. For example, at least part of the first guide portion 213 may be accommodated in the first guide rail 233. In an embodiment, the first rotary structure 210 may rotate about the first axis of rotation R1 in the state in which the first guide portion 213 is accommodated in the first guide rail 233. For example, when the first extending portion 212 is folded or unfolded together with the first housing 110, the first rotary structure 210 may rotate along a rotational path in an arc shape having the first axis of rotation R1 as the center thereof.

In an embodiment, the fixed structure 230 may include a second guide rail 234 for guiding a rotational path of the second rotary structure 220. The second guide rail 234 may be formed on a sidewall of the second opening area 2392 in which the second rotary structure 220 is accommodated. For example, the second guide rail 234 may be formed on at least one of opposite sidewalls of the second opening area 2392. In an embodiment, the second guide rail 234 may have a substantially arc shape. For example, the center of an arc of the second guide rail 234 may form a second axis of rotation R2. Referring to the drawings, the second axis of rotation R2 may be formed in a position spaced apart from the fixed structure 230 and the second rotary structure 220 in the Z-axis direction. In an embodiment, a second guide portion 223 of the second rotary structure 220 may be accommodated in the second guide rail 234.

In an embodiment, the second rotary structure 220 may include the second guide portion 223 formed on the second coupling portion 221. The second guide portion 223, together with the second guide rail 234, may guide the rotational path of the second rotary structure 220. In an embodiment, the second guide portion 223 may protrude from the second coupling portion 221 in the axial direction. For example, at least part of the second guide portion 223 may be accommodated in the second guide rail 234. In an embodiment, the second rotary structure 220 may rotate about the second axis of rotation R2 in the state in which the second guide portion 223 is accommodated in the second guide rail 234. For example, when the second extending portion 222 is folded or unfolded together with the second housing 120, the second rotary structure 220 may rotate along a rotational path in an arc shape having the second axis of rotation R2 as the center thereof.

In an embodiment, the first axis of rotation R1 and the second axis of rotation R2 may be parallel to the axial direction of the hinge structure 200.

Referring to FIG. 4B, in an unfolded state, the first extending portion 212 may limit a rotational direction of the first rotary structure 210 to one direction. For example, a first end portion of the first guide rail 233 may be open, and a second end portion of the first guide rail 233 may be covered by the first extending portion 212. Accordingly, in the unfolded state, the first rotary structure 210 is rotatable about the first axis of rotation R1 in the clockwise direction and is not rotatable in the counterclockwise direction. Referring to FIG. 4C, in the unfolded state, the second extending portion 222 may limit a rotational direction of the second rotary structure 220 to one direction. For example, a third end portion of the second guide rail 234 may be open, and a fourth end portion of the second guide rail 234 may be covered by the second extending portion 222. Accordingly, in the unfolded state, the second rotary structure 220 is rotatable about the second axis of rotation R2 in the counterclockwise direction and is not rotatable in the clockwise direction.

In an embodiment, the fixed structure 230 may have a first fixing hole 2361 through which the first sliding shaft 2351 passes and a second fixing hole 2362 through which the second sliding shaft 2352 passes. The first sliding shaft 2351 and the second sliding shaft 2352 may be fixed to the fixed structure 230.

Referring to FIGS. 4A to 4C and FIG. 5, the first coupling portion 211 may include a first side surface 211b facing the direction of the first axis of rotation R1 and a first arc surface 211a surrounding the direction of the first axis of rotation R1. For example, the first coupling portion 211 may be formed in a substantially cylindrical shape. For example, the first guide portion 213 coupled to the first guide rail 233 may be formed on the first side surface 211b, and the first helical groove 214 coupled to the first guide protrusion 241 may be formed on the first arc surface 211a. The first guide portion 213 may include a portion protruding in the direction of the first axis of rotation R1.

Referring to FIGS. 4A to 4C and FIG. 5, the second coupling portion 221 may include a second side surface 221b facing the direction of the second axis of rotation R2 and a second arc surface 221a surrounding the direction of the second axis of rotation R2. For example, the second coupling portion 221 may be formed in a substantially cylindrical shape. For example, the second guide portion 223 coupled to the second guide rail 234 may be formed on the second side surface 221b, and the second helical groove 224 coupled to the second guide protrusion 242 may be formed on the second arc surface 221a. The second guide portion 223 may include a portion protruding in the direction of the second axis of rotation R2.

FIG. 6 is a view illustrating axes of rotation of rotary structures of a hinge structure and a folding axis of a display according to an embodiment.

Referring to FIG. 6, in an embodiment, a first axis of rotation R1 may be defined as the center of a rotary motion of a first rotary structure 210. For example, the first axis of rotation R1 may be the center of a first guide rail 233 having an arc shape. The first axis of rotation R1 may be formed in a position substantially overlapping a display 140. The first axis of rotation R1 and second axis of rotation R2 may be parallel to each other and may be located at substantially the same height in the Z-axis direction.

In an embodiment, the second axis of rotation R2 may be defined as the center of a rotary motion of the second rotary structure 220. The second axis of rotation R2 may be the center of the second guide rail 234 having an arc shape. The second axis of rotation R2 may be formed in a position substantially overlapping the display 140. The first axis of rotation R1 and the second axis of rotation R2 may be parallel to each other and may be located at substantially the same height in the Z-axis direction.

In an embodiment, the first housing 110 and the second housing 120 may be folded or unfolded with the folding axis F therebetween. The folding axis F may be defined as the center of curvature of the folding area 143 in a state (e.g., the folded state of FIG. 2B or the fully folded state of FIG. 2C) in which the folding area 143 is curved. For example, in the fully folded state illustrated, the distance r between the folding axis F and the folding area 143 may be a minimum radius of curvature of the folding area 143 as curved.

Referring to FIG. 6, a neutral plane P may be a virtual plane overlapping the inside of the display 140 when viewed from one side. The neutral plane P may be a virtual plane having the same length in an unfolded state and a fully folded state. For example, the length may be a length measured from the first edge P1 to the second edge P2 of FIG. 2A in a direction perpendicular to the axial direction. For example, in an unfolded state, the display 140 may include a first surface 1401 located in the +Z-axis direction with respect to the neutral plane P and a second surface 1402 located in the −Z-axis direction with respect to the neutral plane P. For example, the lengths of the first surface 1401 and the second surface 1402 of the display 140 may be increased or decreased in a folding motion and an unfolding motion. For example, in a folded state, the second surface 1402 included in the folding area 143 may have a larger radius of curvature than the first surface 1401 and thus may be longer than the first surface 1401. The length of the first surface 1401 may be decreased. In consideration of the behavior of the display 140, the hinge structure 200 according to the embodiment may be configured such that the first axis of rotation R1 and the second axis of rotation R2 are located on the neutral plane P, the length of which is not changed.

In an embodiment, the minimum distance r between the folding axis F and the folding area 143 in an unfolded state may be substantially the same as the minimum distance r between the folding axis F and the folding area 143 in a fully folded state. To this end, the first axis of rotation R1 of the first rotary structure 210 and the second axis of rotation R2 of the second rotary structure 220 may be located on the neutral plane P of the display 140. For example, referring to the drawing, a portion of the folding area 143 may have the same height in the Z-axis direction in a fully folded state and an unfolded state.

In an embodiment, the first rotary structure 210 may rotate within a first angle range. For example, the first angle range may be a range of more than 90 degrees. In an embodiment, the second rotary structure 220 may rotate within a second angle range. For example, the second angle range may be a range of more than 90 degrees. In an embodiment, the first angle range and the second angle range may be substantially the same as each other. In an embodiment, the first rotary structure 210 and the second rotary structure 220 may rotate in opposite directions about the first axis of rotation R1 and the second axis of rotation R2, respectively. In an embodiment, the first rotary structure 210 and the second rotary structure 220 may be linked with each other to rotate through the same angle.

Referring to FIGS. 7 and 8, a sliding structure for linking rotation of a first rotary structure and rotation of a second rotary structure will be described.

FIG. 7 is a view illustrating rotary structures and a sliding structure of a hinge structure according to an embodiment of the disclosure. FIG. 8 is a view illustrating rotary structures and a sliding structure of a hinge structure according to an embodiment of the disclosure.

Referring to FIG. 7, in an embodiment, a sliding structure 240 may be movably coupled to a first sliding shaft 2351 and a second sliding shaft 2352 fixedly disposed on the fixed structure 230. The sliding structure 240 may be coupled with a first rotary structure 210 and a second rotary structure 220 such that a first guide protrusion 241 is accommodated in a first helical groove 214 of the first rotary structure 210 and the second guide protrusion 242 is accommodated in a second helical groove 224 of the second rotary structure 220. In an embodiment, when the first rotary structure 210 rotates about the first axis of rotation R1 in the first rotational direction, the sliding structure 240 may move to one side. When the sliding structure 240 moves to the one side, the second rotary structure 220 may rotate about the second axis of rotation R2 in the second rotational direction opposite to the first rotational direction. Accordingly, the sliding structure 240 may link the first rotary structure 210 and the second rotary structure 220 such that the first rotary structure 210 and the second rotary structure 220 rotate in opposite directions by the same rotation angle.

In an embodiment, the first sliding shaft 2351 may include a first fixed portion 2353 fixedly coupled to the fixed structure 230. The first fixed portion 2353 may be inserted into a first fixing groove (e.g., a first fixing groove 2371 of FIG. 4A) of the fixed structure 230 and may prevent a movement of the first sliding shaft 2351 in the axial direction. When the sliding structure 240 slides, the first sliding shaft 2351 may be fixed to the fixed structure 230. The first sliding shaft 2351 may be disposed adjacent to the first guide portion 213 of the first rotary structure 210.

In an embodiment, the second sliding shaft 2352 may include a second fixed portion 2354 fixedly coupled to the fixed structure 230. The second fixed portion 2354 may be inserted into a second fixing groove (e.g., a second fixing groove 2372 of FIG. 4A) of the fixed structure 230 and may prevent a movement of the second sliding shaft 2352 in the axial direction. When the sliding structure 240 slides, the second sliding shaft 2352 may be fixed to the fixed structure 230. The second sliding shaft 2352 may be disposed adjacent to the second guide portion 223 of the second rotary structure 220.

In an embodiment, the first axis of rotation R1 and the second axis of rotation R2 may be located between an extension line of the first sliding shaft 2351 and an extension line of the second sliding shaft 2352 when viewed in a direction perpendicular to the axial direction.

In an embodiment, the first guide portion 213 of the first rotary structure 210 may be formed to be a curved surface having an arc shape with the first axis of rotation R1 as the center thereof. The first helical groove 214 may extend along the curved surface of the first guide portion 213. For example, the first helical groove 214 may be a helical groove surrounding the first axis of rotation R1 and extending in the extension direction of the first axis of rotation R1.

In an embodiment, the second guide portion 223 of the second rotary structure 220 may be formed to be a curved surface having an arc shape with the second axis of rotation R2 as the center thereof. The second helical groove 224 may extend along the curved surface of the second guide portion 223. For example, the second helical groove 224 may be a helical groove surrounding the second axis of rotation R2 and extending in the extension direction of the second axis of rotation R2.

In an embodiment, the sliding structure 240 may link rotation of the first rotary structure 210 and rotation of the second rotary structure 220. For example, the first rotary structure 210 and the second rotary structure 220 may rotate in opposite directions by the same angle. In an embodiment, referring to FIG. 8, the sliding structure 240 may move in a first axial direction Φ as the first rotary structure 210 rotates in the first rotational direction (e.g., the clockwise direction). The second rotary structure 220 may rotate in the second rotational direction (e.g., the counterclockwise direction) as the sliding structure 240 moves in the first axial direction Φ. To this end, the first helical groove 214 and the second helical groove 224 may have substantially the same shape. For example, the first helical groove 214 and the second helical groove 224 may extend by substantially the same length.

The hinge structure 200 according to the embodiment may be configured such that the sliding structure 240 links rotation of the first rotary structure 210 and rotation of the second rotary structure 220. Accordingly, the hinge structure 200 may have improved assembly tolerance and backlash, compared to a hinge structure configured such that rotary structures are linked through two idle gears. Backlash may refer to a gap between gear teeth of two gears when the two gears are engaged with each other. That is, the gears may move by the gap. Appropriate backlash may be required to smoothly rotate gears. The hinge structure 200 according to the embodiment may include the helical grooves 214 and 224 and the guide protrusions 241 and 242 rather than a gear tooth form, and thus backlash may be decreased or removed.

FIGS. 9A and 9B are views illustrating helical grooves of rotary structures of a hinge structure according to various embodiments of the disclosure. FIG. 9A is a view illustrating helical grooves using a cylindrical coordinate system. FIG. 9B is a view illustrating coupling portions developed with respect to axes of rotation.

Referring to FIG. 9A, helical grooves 214 and 224 may include first end portions 214-1 and 224-1 and second end portions 214-2 and 224-2. Coupling portions 211 and 221 of rotary structures 210 and 220 may have an arc shape, and the centers of arcs of the coupling portions 211 and 221 may be the first axis of rotation R1 and the second axis of rotation R2. The helical grooves 214 and 224 formed along surfaces of the coupling portions 211 and 221 may be illustrated in the cylindrical coordinate system.

When viewed in the cylindrical coordinate system, the helical grooves 214 and 224 may extend in the axial direction along the surfaces of the coupling portions 211 and 221 by a predetermined length D at a predetermined angle θ. For example, the first end portions 214-1 and 224-1 and the second end portions 214-2 and 224-2 may be spaced apart from each other by the predetermined length D at the predetermined angle θ. In this case, the predetermined angle θ may be the same as the maximum rotational range illustrated in FIG. 6. In an embodiment, the predetermined length D may be substantially the same as the sliding range of the sliding structure 240. In an embodiment, the predetermined angle θ may be 90 degrees or more.

Referring to FIG. 9B, the first helical groove 214 may extend to have a first twist angle θt1 with respect to the axial direction, and the second helical groove 224 may extend to have a second twist angle θt2 with respect to the axial direction. In this case, the first twist angle θt1 and the second twist angle θt2 may have the same magnitude and may be oppositely directed (θt1=−θt2).

The positive direction of the vertical axis in FIG. 9B may refer to the first rotational direction, and the negative direction of the vertical axis in FIG. 9B may refer to the second rotational direction.

Referring to FIG. 9B, when a folding motion is performed from an unfolded state, the first helical groove 214 may rotate such that the first guide protrusion 241 relatively moves in a direction toward the second end portion 214-2 from the first end portion 241-1. The second helical groove 224 may rotate such that the second guide protrusion 242 relatively moves in a direction toward the second end portion 224-2 from the first end portion 224-1. In an embodiment, as the first rotary structure 210 and the second rotary structure 220 rotate, the first guide protrusion 241 and the second guide protrusion 242 of the sliding structure 240 may be located in the first end portions 214-1 and 224-1 in an unfolded state and may be located in the second end portions 214-2 and 224-2 in a fully folded state.

FIG. 10 is a view illustrating sliding shafts and axes of rotation of a hinge structure according to an embodiment of the disclosure.

Referring to FIG. 10, when viewed in a width direction, a first axis of rotation R1 and a second axis of rotation R2 may be located between a first sliding shaft 2351 and a second sliding shaft 2352. Referring to FIG. 2C together, a fully folded state may be a state in which a first rotary structure 210 and a second rotary structure 220 are rotated through 90 degrees or more from an unfolded state.

To implement a rotation angle of 90 degrees or more, the first guide protrusion 241 may be located outward of the first axis of rotation R1 when viewed in the width direction (e.g., a direction perpendicular to the axial direction), and the second guide protrusion 242 may be located outward of the second axis of rotation R2 when viewed in the width direction. For example, when viewed in the width direction, the first axis of rotation R1 and the second axis of rotation R2 may be located between the first guide protrusion 241 and the second guide protrusion 242. Accordingly, the first guide protrusion 241 may be accommodated in a first helical groove (e.g., the first helical groove 214 of FIGS. 9A and 9B) in a state (e.g., a fully folded state) in which the first rotary structure 210 is rotated through 90 degrees or more. The second guide protrusion 242 may be accommodated in a second helical groove (e.g., the second helical groove 224 of FIGS. 9A and 9B) in a state (e.g., a fully folded state) in which the second rotary structure 220 is rotated through 90 degrees or more. In other words, the coupling between the sliding structure 240 and the first rotary structure 210 and the second rotary structure 220 may be maintained even when the hinge structure 200 moves to a fully folded state.

In various embodiments, the maximum rotational range of the first rotary structure 210 and the second rotary structure 220 may be limited by limiting the sliding range of the sliding structure 240.

FIG. 11 is a view illustrating a sliding motion of a sliding structure of a hinge structure according to an embodiment of the disclosure.

The moving direction of the sliding structure 240 when the hinge structure 200 moves from an unfolded state to a fully folded state may be defined as the first axial direction Φ. The moving direction of the sliding structure 240 when the hinge structure 200 moves from the fully folded state to the unfolded state may be defined as the second axial direction.

Referring to FIG. 11, a sliding structure 240 may include the sliding groove 243. For example, the sliding groove 243 may be formed in a position spaced apart from the first rotary structure 210 and the second rotary structure 220 in the axial direction. The screw 238 included in the fixed structure 230 may be disposed in the sliding groove 243. The sliding structure 240 may slide in the axial direction in the state in which the screw 238 is accommodated in the sliding groove 243.

Referring to FIG. 11, the sliding groove 243 may extend in the axial direction. The sliding groove 243 may include a first end portion 243-1 located in the second axial direction ② and a second end portion 243-2 located in the first axial direction Φ. In an embodiment, the sliding structure 240 may move in the first axial direction Φ until the screw 238 makes contact with the first end portion 243-1. In an embodiment, the sliding structure 240 may move in the second axial direction ② until the screw 238 makes contact with the second end portion 243-2. As described above, the sliding groove 243 and the screw 238 may define the sliding range of the sliding structure 240.

In various embodiments, the length by which the sliding groove 243 extends may be related to rotation angles of the first rotary structure 210 and the second rotary structure 220. For example, referring to FIGS. 9A and 9B together, the sliding groove 243 may have a length substantially the same as the distance D measured in the axial direction from the first end portion 214-1 to the second end portion 214-2 of the first helical groove 214 of the first rotary structure 210. For example, the sliding groove 243 may have a length substantially the same as the distance measured in the axial direction from the first end portion 224-1 to the second end portion 224-2 of the second helical groove 224 of the second rotary structure 220.

Hereinafter, a friction structure of the hinge structure 200 according to an embodiment will be described with reference to FIGS. 12, 13, 14A, 14B, 14C, 15A, 16, 17A and 17B. The friction structure may be a structure for providing torque corresponding to a restoring force of the display 140. For example, the restoring force of the display 140 may be applied to the first rotary structure 210 and the second rotary structure 220 in a folded state in which a partial area of the display 140 is curved. For example, the restoring force of the display 140 may be a force by which the display 140 returns to a flat state. For example, the restoring force of the display 140 may be proportional to the size of the display 140. Accordingly, the hinge structure 200 according to the embodiment may include the friction structure for providing torque capable of cancelling out the restoring force. In particular, a friction structure capable of providing torque may be required when a large display is included.

FIG. 12 is a view illustrating a friction structure of a hinge structure according to an embodiment of the disclosure.

Referring to FIG. 12, in an embodiment, a friction structure 250 may include a first washer 252 that is coupled to the screw 238 and that makes surface-to-surface contact with the sliding structure 240, a second washer 253 coupled to the screw 238, and an elastic member 251 disposed between the first washer 252 and the second washer 253.

In an embodiment, the screw 238 may include a body 2381 and a head 2382. For example, the body 2381 may be inserted into the fixed structure 230 and may fix the screw 238 to the fixed structure 230. The body 2381 may pass through the first washer 252, the second washer 253, and the elastic member 251. The body 2381 may be located in the sliding groove 243 of the sliding structure 240. For example, the body 2381 may be located between the first end portion 243-1 and the second end portion 243-2 of the sliding groove 243. The head 2382 may be formed to be larger than the body 2381. The elastic member 251 may include, for example, a plate spring. The elastic member 251 may apply an elastic force in the Z-axis direction. For example, the elastic member 251 may be supported by the second washer 253 and the head 2382 of the screw 238 and may press the first washer 252 toward the fixed structure 230.

In an embodiment, a first area 240a facing toward the fixed structure 230 and a second area 240b facing away from the first area 240a may be defined in the sliding structure 240. The sliding groove 243 may have the form of an opening penetrating the first area 240a and the second area 240b. The body 2381 may pass through the sliding groove 243. The head 2382 may be formed to be larger than the sliding groove 243. The head 2382 may be disposed in the second area 240b of the sliding structure 240. The first washer 252, the second washer 253, and the elastic member 251 may be disposed in the second area 240b of the sliding structure 240 together with the head 2382. For example, the first washer 252 may make direct contact with the second area 240b, and the second washer 253 may make direct contact with the head 2382. The elastic member 251 may be disposed between the first washer 252 and the second washer 253.

In an embodiment, a first friction surface 250a may be formed between the sliding structure 240 and the fixed structure 230, and a second friction surface 250b may be formed between the sliding structure 240 and the first washer 252. When the sliding structure 240 moves, a frictional force may act on the first friction surface 250a and the second friction surface 250b. For example, a user may fold or unfold the electronic device 100 by applying a force greater than the frictional force. For example, the frictional force may be greater than or equal to the restoring force of the display 140. For example, in a state in which a partial area of the display 140 is curved, the display 140 may remain curved without returning to a flat surface. As described above, the hinge structure 200 and the electronic device 100 may include the friction structure 250 providing the surface frictional force to the sliding structure 240. Accordingly, the hinge structure 200 and the electronic device 100 may remain in a constant state.

FIG. 13 is a view illustrating a friction structure of a hinge structure according to an embodiment of the disclosure. FIGS. 14A to 14C are views illustrating a friction structure of a hinge structure according to an embodiment of the disclosure.

Referring to FIG. 13, a first area 240a, which is an area around the sliding groove 243, may be defined in a sliding structure 240. A facing area 230a that faces the first area 240a and that forms surface friction with the first area 240a when the sliding structure 240 moves may be defined in the fixed structure 230.

Referring to FIGS. 13, 14A, 14B, and 14C, a friction structure 250 may include a first washer 252, a second washer 253, an elastic member 251, first protrusions 240p formed on the first area 240a, and second protrusions 230p formed on the facing area 230a. Depending on a movement of the sliding structure 240, the first protrusions 240p and the second protrusions 230p may make surface-to-surface contact with each other, or may be alternately disposed.

Referring to FIGS. 14A to 14C, a body 2381 of a screw 238 may be fixedly coupled to a fixed structure 230. For example, the body 2381 of the screw 238 may be inserted into a fixing hole 2383. The body 2381 of the screw 238 may pass through the first washer 252, the second washer 253, and the elastic member 251. The first washer 252 may be supported by the sliding structure 240, and the second washer 253 may be supported by the head 2382 of the screw 238. The elastic member 251 may be disposed between the first washer 252 and the second washer 253 to apply an elastic force to the first washer 252 and the second washer 253.

FIG. 14A illustrates an unfolded state of a hinge structure, and FIG. 14C illustrates a fully folded state of a hinge structure. FIG. 14B illustrates a free-stop state.

Referring to FIGS. 2A, to 2C and FIGS. 14A to 14C, the free-stop state may include any state (e.g., the folded state illustrated in FIG. 2B) between the unfolded state and the fully folded state. For example, the free-stop state may include a state in which the folding area 143 of the display 140 remains curved. For example, the free-stop state may include a state in which the folding area 143 of the display 140 is curved and the first edge P1 of the first housing 110 and the second edge P2 of the second housing 120 are spaced apart from each other. For example, the free-stop state may include a state in which the third edge P3 of the first housing 110 and the fourth edge P4 of the second housing 120 form an angle greater than that in the fully folded state.

In the unfolded state illustrated in FIG. 14A, the first protrusions 240p may be alternately engaged with the second protrusions 230p. For example, the first protrusions 240p may make contact with the facing area 230a where the second protrusions 230p are not formed. In this case, the first area 240a of the sliding structure 240 and the facing area 230a of the fixed structure 230 may be spaced apart from each other by a first gap G1 in the Z-axis direction. The elastic member 251 may be in a compressed state so as to apply a predetermined elastic force to the sliding structure 240. For example, in the unfolded state, the elastic member 251 may be uncompressed, as compared with when the hinge structure 200 is in the free-stop state illustrated in FIG. 14B.

In the free-stop state illustrated in FIG. 14B, the first protrusions 240p may make surface-to-surface contact with the second protrusions 230p. In this case, the first area 240a of the sliding structure 240 and the facing area 230a of the fixed structure 230 may be spaced apart from each other by a second gap G2 in the Z-axis direction. The second gap G2 may be greater than the first gap G1. Accordingly, in the free-stop state, the elastic member 251 may be compressed, as compared with when the hinge structure 200 is in the unfolded state illustrated in FIG. 14A. An elastic force greater than that in the unfolded state illustrated in FIG. 14A may act on the sliding structure 240.

In the fully folded state illustrated in FIG. 14C, the first protrusions 240p may be engaged with the second protrusions 230p. For example, the first protrusions 240p may make contact with the facing area 230a where the second protrusions 230p are not formed. In this case, the first area 240a of the sliding structure 240 and the facing area 230a of the fixed structure 230 may be spaced apart from each other by a third gap G3 in the Z-axis direction. The third gap G3 may be smaller than the second gap G2. Accordingly, in the fully folded state, the elastic member 251 may be uncompressed, as compared with when the hinge structure 200 is in the free-stop state illustrated in FIG. 14B. An elastic force smaller than that in the free-stop state illustrated in FIG. 14B may act on the sliding structure 240.

In an embodiment, the elastic force applied to the sliding structure 240 by the elastic member 251 may be related to a frictional force between the sliding structure 240 and the fixed structure 230. For example, the frictional force between the sliding structure 240 and the fixed structure 230 may increase as the elastic force increases. Accordingly, the frictional force between the sliding structure 240 and the fixed structure 230 may increase as the elastic member 251 is compressed. For example, in a folded state, the frictional force between the sliding structure 240 and the fixed structure 230 may be greater than that in a fully folded state or an unfolded state. For example, the increased frictional force in the folded state may cancel out the restoring force of the display 140, the folding area 143 of which is curved. Accordingly, the electronic device 100 may stably maintain the folded state in which the folding area 143 is curved.

FIGS. 15A and 15B are views illustrating a sliding structure and a fixed structure of a hinge structure according to various embodiments of the disclosure.

FIG. 15A illustrates a motion in which a hinge structure moves from an unfolded state to a free-stop state and a motion in which a hinge structure moves from the free-stop state to the unfolded state.

Referring to FIG. 15A, first inclined surfaces 240c of the first protrusions 240p may move in a first direction D1. Referring to FIGS. 14A to 14C together, the gap between the sliding structure 240 and the fixed structure 230 may increase (first gap G1→second gap G2), and an elastic member (e.g., the elastic member 251 of FIGS. 14A to 14C) may be compressed. Accordingly, to move from the unfolded state to the free-stop state, the electronic device 100 and/or the hinge structure 200 may require a relatively large force to compress the elastic member 251. When a relatively small force is applied, the electronic device 100 and/or the hinge structure 200 in the unfolded state may remain unfolded without moving to the free-stop state (e.g., without being folded). For example, a user needs to apply a force sufficient to fold the electronic device 100.

Referring to FIG. 15A, the first inclined surfaces 240c of the first protrusions 240p may move in a second direction D2. Referring to FIGS. 14A to 14C together, the gap between the sliding structure 240 and the fixed structure 230 may decrease (second gap G2→first gap G1), and the compressed elastic member 251 may be uncompressed. As the compressed elastic member 251 is uncompressed, the elastic member 251 may press the first protrusions 240p in the second direction D2. Accordingly, the electronic device 100 and/or the hinge structure 200 may move from the free-stop state to the unfolded state with a relatively small force. For example, when the electronic device 100 and/or the hinge structure 200 moves from the free-stop state to the unfolded state, elastic energy of the elastic member 251 may be converted into kinetic energy, and thus the electronic device 100 and/or the hinge structure 200 may rapidly move to the unfolded state.

FIG. 15B illustrates a motion in which a hinge structure moves from a fully folded state to a free-stop state and a motion in which a hinge structure moves from a free-stop state to a fully folded state.

Referring to FIG. 15B, first inclined surfaces 240c of first protrusions 240p may move in a third direction D3. Referring to FIGS. 14A to 14C together, the gap between a sliding structure 240 and a fixed structure 230 may increase (third gap G3→second gap G2), and the elastic member 251 may be compressed. Accordingly, to move from the fully folded state to the free-stop state, the electronic device 100 and/or a hinge structure 200 may require a relatively large force to compress the elastic member 251. When a relatively small force is applied, the electronic device 100 and/or the hinge structure 200 in the fully folded state may remain fully folded without moving to the free-stop state (e.g., without being unfolded). For example, the user needs to apply a force sufficient to unfold the electronic device 100.

Referring to FIG. 15B, first inclined surfaces 240c of first protrusions 240p may move in a fourth direction D4. Referring to FIGS. 14A to 14C together, the gap between the sliding structure 240 and the fixed structure 230 may decrease (second gap G2→third gap G3), and the compressed elastic member 251 may be uncompressed. As the compressed elastic member 251 is uncompressed, the elastic member 251 may press the first protrusions 240p in the fourth direction D4. Accordingly, the electronic device 100 and/or the hinge structure 200 may move from the free-stop state to the fully folded state with a relatively small force. For example, when at least one of the electronic device 100 or the hinge structure 200 moves from the free-stop state to the fully folded state, elastic energy of the elastic member 251 may be converted into kinetic energy, and thus the electronic device 100 and/or the hinge structure 200 may rapidly move to the fully folded state.

Referring to FIGS. 15A and 15B, the hinge structure 200 according to the embodiment may include the first protrusions 240p of the sliding structure 240 and the second protrusions 230p of the fixed structure 230 that are engaged with the first protrusions 240p and may be configured to rapidly move to an unfolded state or a fully folded state when deviating from a free-stop state. Furthermore, the hinge structure 200 having moved to the unfolded state or the fully folded state may remain unfolded or fully folded, when a sufficient force required for deviation from the unfolded state or the fully folded state is not applied. Through the above-described motion of the hinge structure 200, the user may recognize that the unfolded state or the fully folded state of the electronic device 100 is firmly maintained.

Furthermore, when the hinge structure 200 moves from the free-stop state to the unfolded state or the fully folded state, the first protrusions 240p may rapidly move toward the facing area 230a of the fixed structure 230 along second inclined surfaces 230c and may collide with the facing area 230a, and the second protrusions 230p may rapidly move toward the first area 240a of the sliding structure 240 along the first inclined surfaces 240c and may collide with the facing area 230a. The hinge structure 200 may provide sound or vibration depending on the collision to the user, thereby enabling the user to recognize that the electronic device 100 successfully reaches the unfolded state and the fully folded state.

FIG. 16 is a view illustrating a hinge structure according to an embodiment of the disclosure. FIGS. 17A and 17B, is a view illustrating a second friction structure of a hinge structure according to an embodiment of the disclosure.

Referring to FIG. 16 and FIGS. 17A and 17B, a hinge structure 200 according to an embodiment may include a fixed structure 230, a sliding structure 240, a first rotary structure 210, a second rotary structure 220, and the second friction structure 350. The fixed structure 230, the sliding structure 240, the first rotary structure 210, and the second rotary structure 220 are substantially the same as those described above with reference to FIGS. 3, 4A, 4B, 4C, 5, 6, 7, 8, 9A, 9B, and 10. Therefore, the following description will be focused on the second friction structure 350.

Referring to FIG. 16, the second friction structure 350 may include extending shafts 351 and 352 extending from the fixed structure 230 to opposite sides in an axial direction and shaft tightening members 353 and 354 included in the sliding structure 240 and coupled to the extending shafts 351 and 352.

In an embodiment, the extending shafts 351 and 352 may include a first extending shaft 351 extending from the fixed structure 230 in a first axial direction ① and a second extending shaft 352 extending from the fixed structure 230 in a second axial direction ②. The first extending shaft 351 and the second extending shaft 352 may be fixed together with the fixed structure 230.

In an embodiment, the first extending shaft 351 may pass through the sliding structure 240. For example, the sliding structure 240 may slide along the first extending shaft 351. In an embodiment, the first extending shaft 351 may pass through the first shaft tightening member 353. For example, the first shaft tightening member 353 may be press-fit onto the first extending shaft 351.

In an embodiment, the second extending shaft 352 may pass through the sliding structure 240. For example, the sliding structure 240 may slide along the second extending shaft 352. In an embodiment, the second extending shaft 352 may pass through the second shaft tightening member 354. For example, the second shaft tightening member 354 may be press-fit onto the second extending shaft 352.

In an embodiment, the sliding structure 240 may include a first plate 2481 and a second plate 2482. For example, the first plate 2481 and the second plate 2482 may be located in the first axial direction ① from a second guide protrusion 242 of the sliding structure 240. The first shaft tightening member 353 may be disposed between the first plate 2481 and the second plate 2482.

In an embodiment, a first through-hole 3591 may be formed through the first plate 2481 and the second plate 2482 of the sliding structure 240. The first extending shaft 351 may be inserted into the first through-hole 3591. The first through-hole 3591 may be aligned with a hole (e.g., hole 3532 of FIG. 19B) of the first shaft tightening member 353. The first shaft tightening member 353 may be disposed between the first plate 2481 and the second plate 2482 such that the hole is aligned with the first through-hole 3591.

In an embodiment, the sliding structure 240 may include a third plate 2483 and a fourth plate 2484. For example, the third plate 2483 and the fourth plate 2484 may be located in the second axial direction ② from a first guide protrusion 241 of the sliding structure 240. The second shaft tightening member 354 may be disposed between the third plate 2483 and the fourth plate 2484.

In an embodiment, a second through-hole 3592 may be formed through the third plate 2483 and the fourth plate 2484 of the sliding structure 240. The second extending shaft 352 may be inserted into the second through-hole 3592. The second through-hole 3592 may be aligned with a hole (e.g., the hole 3532 of FIG. 19B) of the second shaft tightening member 354. The second shaft tightening member 354 may be disposed between the third plate 2483 and the fourth plate 2484 such that the hole is aligned with the second through-hole 3592.

Referring to FIGS. 17A and 17B, a thread 3512 fastened into the fixed structure 230 may be formed on the first extending shaft 351, and a corresponding thread may be formed in the fixed structure 230. The length by which the first extending shaft 351 extends from the fixed structure 230 may be changed by varying the length by which the thread 3512 and the corresponding thread are fastened with each other. For example, the extension length of the first extending shaft 351 may be decreased when the first extending shaft 351 is fastened deeper into the fixed structure 230.

In an embodiment, the first extending shaft 351 may have a first head 3511. For example, the first head 3511 may be formed on an end portion of the first extending shaft 351 that faces the first axial direction Φ. The first head 3511 may define a sliding range of the sliding structure 240 in the first axial direction Φ. In an embodiment, the first head 3511 may be formed to be larger than the first through-hole 3591 so as not to be inserted into the first through-hole 3591 of the sliding structure 240.

Referring to FIGS. 17A and 17B, a thread 3522 fastened into the fixed structure 230 may be formed on the second extending shaft 352, and a corresponding thread may be formed in the fixed structure 230. The length by which the second extending shaft 352 extends from the fixed structure 230 may be changed by varying the length by which the thread 3522 and the corresponding thread are fastened with each other. For example, the extension length of the second extending shaft 352 may be decreased when the second extending shaft 352 is fastened deeper into the fixed structure 230.

In an embodiment, the second extending shaft 352 may have a second head 3521. For example, the second head 3521 may be formed on an end portion of the second extending shaft 352 that faces the second axial direction ②. The second head 3521 may define a sliding range of the sliding structure 240 in the second axial direction ②. In an embodiment, the second head 3521 may be formed to be larger than the second through-hole 3592 so as not to be inserted into the second through-hole 3592 of the sliding structure 240.

In an embodiment, the first head 3511 and the second head 3521 may function as stoppers defining a sliding range of the sliding structure 240. The sliding structure 240 may be movable in the first axial direction Φ until the second plate 2482 makes contact with the first head 3511 and may be movable in the second axial direction ② until the fourth plate 2484 makes contact with the second head 3521. For example, the sliding range of the sliding structure 240 in the first axial direction Φ may be changed by varying the length by which the first extending shaft 351 is screw-coupled to the fixed structure 230. For example, the sliding range of the sliding structure 240 in the second axial direction ② may be changed by varying the length by which the second extending shaft 352 is screw-coupled to the fixed structure 230.

As described above, in the hinge structure 200 according to the embodiment, the extending shafts 351 and 352 may be screw-coupled to the fixed structure 230. Accordingly, the extension lengths of the first extending shaft 351 and the second extending shaft 352 may be easily changed, and the sliding range of the sliding structure 240 may be easily changed. Furthermore, rotation angles of the first rotary structure 210 and the second rotary structure 220 linked with the sliding range may be easily changed.

FIG. 18 is a view illustrating a shaft tightening member of a hinge structure according to an embodiment of the disclosure. FIGS. 19A and 19B are views illustrating a shaft tightening member of a hinge structure according to various embodiments of the disclosure.

Referring to FIGS. 18, 19A, and 19B, a first extending shaft 351 and a first shaft tightening member 353 are illustrated. However, the following description may be identically applied to a second extending shaft 352 and a second shaft tightening member 354.

In an embodiment, the first shaft tightening member 353 may slide in the axial direction together with the sliding structure 240 in the state of being disposed between the first plate 2481 and the second plate 2482 of the sliding structure 240. In an embodiment, a nut 355 may be fastened to the first shaft tightening member 353. For example, a thread 3531 may be formed on an outer circumferential surface of the first shaft tightening member 353, and a thread corresponding to the thread 3531 may be formed on an inner circumferential surface of the nut 355.

FIG. 19A is a sectional view taken along line A-A' of FIG. 18. FIG. 19B is a view illustrating a surface of a first shaft tightening member facing an axial direction.

Referring to FIG. 19A, a first shaft tightening member 353 may be coupled to a first extending shaft 351. For example, the first extending shaft 351 may pass through the first shaft tightening member 353. For example, the first shaft tightening member 353 may be press-fit onto the first extending shaft 351.

In an embodiment, the nut 355 may be coupled to the thread 3531 of the first shaft tightening member 353. The area where the first shaft tightening member 353 is press-fit onto the first extending shaft 351 may include the area where the nut 355 is located. The nut 355 may press the first shaft tightening member 353 such that the first shaft tightening member 353 is press-fit onto the first extending shaft 351.

Referring to FIG. 19B, a first shaft tightening member 353 may have an inner diameter substantially the same as, or smaller than, the diameter of the first extending shaft 351. For ease of assembly with the first extending shaft 351, a slit 3533 may be formed in the first shaft tightening member 353. The slit 3533 may extend from a surface 353a of the first shaft tightening member 353 that faces toward the first extending shaft 351 to an inner circumferential surface 353b of the first shaft tightening member 353. The slit 3533 may extend along the extension direction of the first extending shaft 351. The slit 3533 may include a plurality of slits 3533 located in different radial directions with respect to the central axis of the first extending shaft 351. For example, referring to FIG. 19B, each of the plurality of slits 3533 may form an angle of 90 degrees with an adjacent slit 3533. However, the number of slits 3533 is not limited to that illustrated in FIG. 19B.

In an embodiment, the slits 3533 may be formed such that the gap therebetween is increased in the radial directions when the first extending shaft 351 is inserted into the first shaft tightening member 353. The first extending shaft 351 may be inserted into the hole 3532 of the first shaft tightening member 353 by the slits 3533. In an embodiment, the nut 355 may tighten the slits 3533 such that the inner circumferential surface 353b of the first shaft tightening member 353 presses the outer circumferential surface of the first extending shaft 351 inserted into the hole 3532.

Referring to FIG. 19B, the hinge structure 200 may be configured such that the area by which the first shaft tightening member 353 is press-fit onto the first extending shaft 351 is changed by adjusting the position of the nut 355. The area by which the first shaft tightening member 353 is press-fit onto the first extending shaft 351 may be proportional to a frictional force between the sliding structure 240 and the fixed structure 230. As described above, the hinge structure 200 may provide various torques through a simple change in the position of the nut 355.

FIG. 20 is a view illustrating a hinge structure according to an embodiment of the disclosure. FIG. 21 is an exploded perspective view illustrating a hinge structure according to an embodiment of the disclosure. FIG. 22 is a view illustrating a third friction structure of a hinge structure according to an embodiment of the disclosure. FIG. 22 is an enlarged view illustrating an inside of portion A in FIG. 20.

Referring to FIG. 20, in an embodiment, a hinge structure 200 may include a fixed structure 230, a first rotary structure 210, a second rotary structure 220, a sliding structure 240, and an arm structure 301.

The fixed structure 230, the first rotary structure 210, the second rotary structure 220, and the sliding structure 240 illustrated are substantially the same as those described above with reference to FIGS. 3, 4A, 4B, 4C, 5, 6, 7, 8, 9A and 9B. For example, the first rotary structure 210 and the second rotary structure 220 may be coupled to the fixed structure 230 so as to rotate about the first axis of rotation R1 and the second axis of rotation R2, respectively. The sliding structure 240 may be slidably coupled to the fixed structure 230 so as to link the rotation of the first rotary structure 210 and the rotation of the second rotary structure 220.

In an embodiment, the hinge structure 200 may further include the arm structure 301 and the third friction structure.

In an embodiment, the arm structure 301 may include first arms 310, second arms 320, first arm shafts 311, second arm shafts 321, a first sliding pin 312, and second sliding pins 322. The first arm shafts 311, the second arm shafts 321, the first sliding pin 312, and the second sliding pins 322 may extend parallel to an axial direction.

In an embodiment, the hinge structure 200 may include fixing members 330 disposed on the fixed structure 230 in a first axial direction ① and a second axial direction ②. The fixing members 330 may be configured to support rotation of the first arm shafts 311 and the second arm shafts 321.

In an embodiment, the first rotary structure 210 may include a first coupling portion 211 rotatably coupled to the fixed structure 230, the first extending portion 212 that extends from the first coupling portion 211 in a direction perpendicular to the axial direction and that is connected to a first housing (e.g., the first housing 110 of FIG. 1), and a plurality of first friction portions (i.e., first friction portions 216) generating friction with first friction plates 361. The first friction portions 216 may extend from the first extending portion 212 in the direction perpendicular to the axial direction. The first coupling portion 211 may be accommodated in the first opening area 2391 of the fixed structure 230. A first guide portion (e.g., the first guide portion 213 of FIG. 4B) may be formed on the first coupling portion 211.

In an embodiment, first sliding grooves 215 may be formed in side surfaces of the first friction portions 216 that face the axial direction. The first sliding pin 312 and first fixing pins 313 may be accommodated in the first sliding grooves 215. The first sliding grooves 215 may form a sliding path of the first sliding pin 312 and the first fixing pins 313 when the first rotary structure 210 and the first arms 310 rotate. In an embodiment, the first friction plates 361 may be disposed between the first friction portions 216 in the axial direction. The first friction portions 216 and the first friction plates 361 may be configured to make surface-to-surface contact with each other.

In an embodiment, the first arms 310 may be coupled to the fixing members 330 so as to rotate together with the first rotary structure 210 relative to the fixed structure 230. The first arms 310 may be configured to slide relative to the first rotary structure 210 when the first rotary structure 210 rotates about the first axis of rotation R1. In an embodiment, the first arms 310 may rotate about the first arm shafts 311 fastened to the fixing members 330. The first arms 310 may be disposed on one side or opposite sides of the first rotary structure 210 in the axial direction. The first sliding pin 312 and the first fixing pins 313 may rotate about the first arm shafts 311 together with the first arms 310. In an embodiment, the first arms 310 may slide relative to the first rotary structure 210 in the state in which the first sliding pin 312 are accommodated in the first sliding grooves 215 of the first rotary structure 210. For example, the first sliding pin 312 and the first fixing pins 313 may move along the first sliding grooves 215 when the first arms 310 and the first rotary structure 210 rotate.

In an embodiment, first through-holes 3141 and second through-holes 3142 may be formed through the first arms 310 and the first friction plates 361. For example, the first sliding pin 312 may be inserted into the first through-holes 3141, and the first fixing pins 313 may be inserted into the second through-holes 3142. Accordingly, the first arms 310 and the first friction plates 361 may be configured to rotate together about the first arm shafts 311. Furthermore, the first sliding pin 312 and the first fixing pins 313 may further extend into the first sliding grooves 215 formed in the first friction portions 216 and may be configured such that the first arms 310 and the first friction plates 361 slide together relative to the first rotary structure 210 when the first rotary structure 210 rotates.

In an embodiment, first elastic members 318 and first nut members 319 may be coupled to the first sliding pin 312. The first nut members 319 may be disposed on end portions of the first sliding pin 312, and the first elastic members 318 may be disposed between the first arms 310 and the first nut members 319. The first elastic members 318 may be supported on the first nut members 319 and may apply elastic forces to the first friction plates 361 or the first arms 310 in the axial direction. When the first arms 310 and the first rotary structure 210 are repeatedly driven, the first friction plates 361 and the first friction portions 216 may be worn. When the wear is accumulated, the first friction plates 361 and the first friction portions 216 may not form sufficient frictional forces. The first elastic members 318 and the first nut members 319 may compensate for an amount of wear by pressing at least one of the first friction plates 361 or the first friction portions 216 such that the first friction plates 361 and the first friction portions 216 form sufficient frictional forces.

In an embodiment, the second rotary structure 220 may include the second coupling portion 221 rotatably coupled to the fixed structure 230, the second extending portion 222 that extends from the second coupling portion 221 in a direction perpendicular to the axial direction and that is connected to a second housing (e.g., the second housing 120 of FIG. 1), and a plurality of second friction portions (e.g., second friction portions 226) generating friction with second friction plates 362. The second friction portions 226 may extend from the second extending portion 222 in the direction perpendicular to the axial direction. The second coupling portion 221 may be accommodated in the second opening area 2392 of the fixed structure 230. A second guide portion (e.g., the second guide portion 223 of FIG. 4C) may be formed on the second coupling portion 221.

In an embodiment, second sliding grooves 225 may be formed in side surfaces of the second friction portions 226 that face the axial direction. The second sliding pins 322 and second fixing pins 323 may be accommodated in the second sliding grooves 225. The second sliding grooves 225 may form a sliding path of the second sliding pins 322 and the second fixing pins 323 when the second rotary structure 220 and the second arms 320 rotate. In an embodiment, the second friction plates 362 may be disposed between the second friction portions 226 in the axial direction. The second friction portions 226 and the second friction plates 362 may be configured to make surface-to-surface contact with each other.

In an embodiment, the second arms 320 may be coupled to the fixing members 330 so as to rotate together with the second rotary structure 220 relative to the fixed structure 230. The second arms 320 may be configured to slide relative to the second rotary structure 220 when the second rotary structure 220 rotates about the second axis of rotation R2. In an embodiment, the second arms 320 may rotate about the second arm shafts 321 fastened to the fixing members 330. The second arms 320 may be disposed on one side or opposite sides of the second rotary structure 220 in the axial direction. The second sliding pins 322 and the second fixing pins 323 may rotate about the second arm shafts 321 together with the second arms 320. In an embodiment, the second arms 320 may slide relative to the second rotary structure 220 in the state in which the second sliding pins 322 are accommodated in the second sliding grooves 225 of the second rotary structure 220. For example, the second sliding pins 322 and the second fixing pins 323 may move along the second sliding grooves 225 when the second arms 320 and the second rotary structure 220 rotate.

In an embodiment, third through-holes 3241 and fourth through-holes 3242 may be formed through the second arms 320 and the second friction plates 362. For example, the second sliding pins 322 may be inserted into the third through-holes 3241, and the second fixing pins 323 may be inserted into the fourth through-holes 3242. Accordingly, the second arms 320 and the second friction plates 362 may be configured to rotate together about the second arm shafts 321. Furthermore, the second sliding pins 322 and the second fixing pins 323 may further extend into the second sliding grooves 225 formed in the second friction portions 226 and may be configured such that the second arms 320 and the second friction plates 362 slide together relative to the second rotary structure 220 when the second rotary structure 220 rotates.

In an embodiment, second elastic members 328 and second nut members 329 may be coupled to the second sliding pins 322. The second nut members 329 may be disposed on end portions of the second sliding pins 322, and the second elastic members 328 may be disposed between the second arms 320 and the second nut members 329. The second elastic members 328 may be supported on the second nut members 329 and may apply elastic forces to the second friction plates 362 or the second arms 320 in the axial direction. When the second arms 320 and the second rotary structure 220 are repeatedly driven, the second friction plates 362 and the second friction portions 226 may be worn. When the wear is accumulated, the second friction plates 362 and the second friction portions 226 may not form sufficient frictional forces. The second elastic members 328 and the second nut members 329 may compensate for an amount of wear by pressing at least one of the second friction plates 362 or the second friction portions 226 such that the second friction plates 362 and the second friction portions 226 form sufficient frictional forces.

In an embodiment, the third friction structure may include the first fixing pins 313, the second fixing pins 323, the first friction plates 361, and the second friction plates 362.

In an embodiment, the first friction plates 361 may be configured to be rotatable about the first arm shafts 311 together with the first arms 310 and slidable relative to the first rotary structure 210. For example, the first friction plates 361 may rotate together with the first arms 310 through the first fixing pins 313 and the first sliding pin 312. For example, the first sliding pin 312 may extend into the first sliding grooves 215 through the first through-holes 3141 penetrating the first friction plates 361 and the first arms 310. The first fixing pins 313 may extend into the first sliding grooves 215 through the second through-holes 3142 penetrating the first friction plates 361 and the first arms 310. For example, when the first arms 310 and the first rotary structure 210 rotate, the first friction plates 361 may rotate along the same rotational path as the rotational path of the first arms 310. In an embodiment, the first friction plates 361 may be disposed to make contact with the first friction portions 216 of the first rotary structure 210 in the axial direction. For example, at least parts of the first friction plates 361 may be disposed between the first friction portions 216. In an embodiment, the first fixing pins 313 and the first sliding pin 312 may pass through the first friction plates 361. For example, the first fixing pins 313 and the first sliding pin 312 may pass through the first sliding grooves 215 of the first friction portions 216 and may pass through the first friction plates 361. In an embodiment, when the first rotary structure 210 and the first arms 310 rotate, the first arms 310 and the first friction plates 361 may slide relative to the first rotary structure 210 in a direction perpendicular to the axial direction. At this time, surface friction may be generated between the first friction plates 361 and the first friction portions 216 of the first rotary structure 210.

In an embodiment, the second friction plates 362 may be configured to be rotatable about the second arm shafts 321 together with the second arms 320 and slidable relative to the second rotary structure 220. For example, the second friction plates 362 may rotate together with the second arms 320 through the second fixing pins 323 and the second sliding pins 322. For example, the second sliding pins 322 may extend into the second sliding grooves 225 through the third through-holes 3241 penetrating the second friction plates 362 and the second arms 320. The second fixing pins 323 may extend into the second sliding grooves 225 through the fourth through-holes 3242 penetrating the second friction plates 362 and the second arms 320. In an embodiment, when the second arms 320 and the second rotary structure 220 rotate, the second friction plates 362 may rotate along the same rotational path as the rotational path of the second arms 320. In an embodiment, the second friction plates 362 may be disposed to make contact with the second friction portions 226 of the second rotary structure 220 in the axial direction. For example, at least parts of the second friction plates 362 may be disposed between the second friction portions 226. In an embodiment, the second fixing pins 323 and the second sliding pins 322 may pass through the second friction plates 362. For example, the second fixing pins 323 and the second sliding pins 322 may pass through the second sliding grooves 225 of the second friction portions 226 and may pass through the second friction plates 362. In an embodiment, when the second rotary structure 220 and the second arms 320 rotate, the second arms 320 and the second friction plates 362 may slide relative to the second rotary structure 220 in a direction perpendicular to the axial direction. At this time, surface friction may be generated between the second friction plates 362 and the second friction portions 226 of the second rotary structure 220.

FIG. 23 is a view illustrating a folding motion of a hinge structure according to an embodiment of the disclosure. In FIG. 23, the fixed structure 230 and the sliding structure 240 of the hinge structure 200 illustrated in FIGS. 20 to 22 are omitted.

Referring to FIG. 23, when a hinge structure 200 is folded or unfolded, rotary structures 210 and 220 and arms 310 and 320 may rotate about different axes. For example, the rotary structures 210 and 220 and the arms 310 and 320 may rotate along different rotational paths. Due to the difference in rotational path between the rotary structures 210 and 220 and the arms 310 and 320, the arms 310 and 320 may slide when the hinge structure 200 is folded or unfolded.

Referring to FIG. 23, friction portions 216 and 226 of the rotary structures 210 and 220 may be integrally formed with the extending portions 212 and 222, or may be formed so as to be detachable from the extending portions 212 and 222. For example, the rotary structures 210 and 220 may further include third fixing pins 217 for coupling the separate friction portions 216 and 226 with the extending portions 212 and 222.

In an embodiment, the first rotary structure 210 may rotate about the first axis of rotation R1 in a first rotational direction. For example, in a folding motion, the first rotary structure 210 may rotate in the clockwise direction. For example, based on an unfolded state, the point where the first sliding pin 312 is located in the first rotary structure 210 may be defined as a first point A1. In folding and unfolding motions, the first point A1 of the first rotary structure 210 may move along a first rotational path Z1.

Referring to FIG. 23, the first arms 310 and the first sliding pin 312 may rotate about the first arm shafts 311. For example, in a folding motion, the first arms 310 and the first sliding pin 312 may rotate in the clockwise direction. For example, in an unfolded state, the first sliding pin 312 may be located at the first point A1, and in a folded state, the first sliding pin 312 may be located at a position spaced apart from the first point A1 in a direction perpendicular to the axial direction. The first sliding pin 312 may move along a second rotational path Z2 in folding and unfolding motions.

In various embodiments, the first rotational path Z1 and the second rotational path Z2 may differ from each other. For example, the first axis of rotation R1 and the first arm shafts 311 may be parallel to each other, but may not be in agreement with each other, and the radii of rotation of the first rotary structure 210 and the first arms 310 may not be in agreement with each other.

Accordingly, in folding and unfolding motions, the first arms 310 and the first sliding pin 312 may slide relative to the first rotary structure 210. The sliding motion of the first sliding pin 312 and the first arms 310 may be guided as the first sliding pin 312 is accommodated in the first sliding groove 215 of the first rotary structure 210. In an embodiment, when a folding motion is performed from an unfolded state, the distance between the first sliding pin 312 and the first point A1 may increase. When an unfolding motion is performed from a fully folded state, the distance between the first sliding pin 312 and the first point A1 may decrease.

In an embodiment, the second rotary structure 220 may rotate about the second axis of rotation R2 in a second rotational direction. For example, in a folding motion, the second rotary structure 220 may rotate in the counterclockwise direction. For example, based on an unfolded state, the point where the second sliding pins 322 are located in the second rotary structure 220 may be defined as a second point A2. In folding and unfolding motions, the second point A2 may move along a third rotational path Z3.

In an embodiment, the second arms 320 and the second sliding pins 322 may rotate about the second arm shafts 321. For example, in a folding motion, the second arms 320 and the second sliding pins 322 may rotate in the counterclockwise direction. For example, in an unfolded state, the second sliding pins 322 may be located at the second point A2, and in a folded state, the second sliding pins 322 may be located at a position spaced apart from the second point A2 in a direction perpendicular to the axial direction. The second sliding pins 322 may move along a fourth rotational path Z4 in folding and unfolding motions.

In various embodiments, the third rotational path Z3 and the fourth rotational path Z4 may differ from each other. For example, the second axis of rotation R2 and the second arm shafts 321 may be parallel to each other, but may not be in agreement with each other, and the radii of rotation of the second rotary structure 220 and the second arms 320 may not be in agreement with each other.

Accordingly, in folding and unfolding motions, the second arms 320 and the second sliding pins 322 may slide relative to the second rotary structure 220. The sliding motion of the second sliding pins 322 and the second arms 320 may be guided as the second sliding pins 322 is accommodated in the second sliding grooves 225 of the second rotary structure 220. In an embodiment, when a folding motion is performed from an unfolded state, the distance between the second sliding pins 322 and the second point A2 may increase. When an unfolding motion is performed from a fully folded state, the distance between the second sliding pins 322 and the second point A2 may decrease.

FIGS. 24A to 24C are views illustrating a third friction structure of a hinge structure according to an embodiment of the disclosure. FIG. 24A illustrates an unfolded state and FIG. 24C illustrates a fully folded state. FIG. 24B illustrates a free-stop state.

In folding and unfolding motions, the friction plates 361 and 362 may rotate together with the arms 310 and 320 and may slide relative to the friction portions 216 and 226 of the rotary structures 210 and 220. In a sliding motion, frictional forces may act between the friction portions 216 and 226 and the friction plates 361 and 362.

In an embodiment, the hinge structure 200 may be configured such that contact areas between the friction portions 216 and 226 and the friction plates 361 and 362 vary depending on states of the hinge structure 200. In an embodiment, the hinge structure 200 may be configured such that the areas of contact surfaces formed by the friction plates 361 and 362 and the friction portions 216 and 226 increase with an approach to the free-stop state.

Referring to FIGS. 24A to 24C, first friction portions 216 and first friction plates 361 of a first rotary structure 210 are illustrated. However, the following description may be identically applied to the second friction portions 226 and the second friction plates 362 of the second rotary structure 220.

In an embodiment, each of the first friction portions 216 may include a first portion 216a having a first width W1 and second portions 216b having a second width W2 smaller than the first width W1. In this case, the widths of the first friction portions 216 may be lengths measured in the axial direction. The second portions 216b of the first friction portions 216 may extend from the first portion 216a to opposite sides in directions perpendicular to the axial direction. For example, the first portion 216a may be formed between the second portions 216b when viewed in the directions perpendicular to the axial direction. For example, when viewed in a direction perpendicular to the axial direction from the first extending portion 212 of the first rotary structure 210, one of the second portions 216b may be connected to the first extending portion 212, the first portion 216a may extend from the one second portion 216b, and the other second portion 216b may extend from the first portion 216a.

In an embodiment, in the unfolded state, the first friction portions 216 and the first friction plates 361 may form contact surfaces having a first area AR1. For example, in the unfolded state, at least parts of the first friction plates 361 may be disposed to face the second portions 216b of the first friction portions 216. For example, parts of the first friction plates 361 may be spaced apart from inclined surfaces 216-2 of the second portions 216b, and other parts of the first friction plates 361 may make contact with opposite surfaces 216-1 of the first portion 216a.

In an embodiment, in the free-stop state, the first friction portions 216 and the first friction plates 361 may form contact surfaces having a second area AR2. The second area AR2 may be greater than the first area AR1. For example, the first friction plates 361 may make contact with the opposite surfaces 216-1 of the first portion 216a.

In an embodiment, in the fully folded state, the first friction portions 216 and the first friction plates 361 may form contact surfaces having a third area AR3. The third area AR3 may be smaller than the second area AR2. For example, in the fully folded state, at least parts of the first friction plates 361 may be disposed to face the second portions 216b of the first friction portions 216. For example, parts of the first friction plates 361 may be spaced apart from the inclined surfaces 216-2 of the second portions 216b, and other parts of the first friction plates 361 may make contact with the opposite surfaces 216-1 of the first portion 216a.

First end portions 215-1 and 225-1 relatively far away from the first arm shafts 311 (or, the first axis of rotation R1) and second end portions 215-2 and 225-2 relatively close to the first arm shafts 311 (or, the first axis of rotation R1) may be defined in each of the first sliding grooves 215.

In an embodiment, when a folding motion from the unfolded state to the free-stop state is performed, the first friction plates 361, together with the first sliding pin 312, may move toward the second end portions 215-2 and 225-2 of the first sliding grooves 215. At this time, contact areas between the first friction plates 361 and the first friction portions 216 may increase.

In an embodiment, when an unfolding motion from the fully folded state to the free-stop state is performed, the first friction plates 361, together with the first sliding pin 312, may move toward the first end portions 215-1 and 225-1 of the first sliding grooves 215. At this time, contact areas between the first friction plates 361 and the first friction portions 216 may increase.

The hinge structure 200 according to the embodiment may be configured to provide a larger frictional force in the free-stop state than in the unfolded state or the fully folded state. The hinge structure 200 may stably maintain any folded state included in a free-stop section by using the frictional force. Accordingly, the hinge structure 200 may provide the free-stop section capable of stably maintaining folded states at various angles.

FIG. 25 is a view illustrating part of a hinge structure according to an embodiment of the disclosure. FIGS. 26A to 26C are views illustrating a fourth friction structure of a hinge structure according to an embodiment of the disclosure. FIG. 26A illustrates an unfolded state and FIG. 26C illustrates a fully folded state. FIG. 26B illustrates a folded state included in a free-stop section.

Referring to FIG. 25, in an embodiment, a fourth friction structure 304 may include a first cam structure 371 formed on first arms 310, a second cam structure 372 formed on second arms 320, a cam member 380 coupled to first arm shafts 311 and second arm shafts 321, and elastic members 390 disposed between a fixing member (e.g., one of the fixing members 330) and the cam member 380. The fixing members 330 may be fixedly disposed inside a hinge housing (e.g., the hinge housing 130 of FIG. 1). The fixing members 330 may support rotation of the first arm shafts 311 and the second arm shafts 321.

In an embodiment, the first cam structure 371 may be formed on an area around a through-hole of the first arms 310 through which the first arm shafts 311 passes. The first cam structure 371 may be engaged with a first camp portion 381 of the cam member 380. The first cam structure 371 may include first protrusions 371b protruding toward the first cam portion 381 of the cam member 380 and first depressions 371a formed between the first protrusions 371b.

In an embodiment, the second cam structure 372 may be formed on an area around a through-hole of the second arms 320 through which the second arm shafts 321 pass. The second cam structure 372 may be engaged with a second cam portion 382 of the cam member 380. The second cam structure 372 may include second protrusions 372b protruding toward the second cam portion 382 of the cam member 380 and second depressions 372a formed between the second protrusions 372b.

In an embodiment, the cam member 380 may be formed such that the first arm shafts 311 and the second arm shafts 321 pass through the cam member 380. The cam member 380 may be configured to be movable in an axial direction along the first arm shafts 311 and the second arm shafts 321. For example, the cam member 380 may be pressed in the axial direction by the elastic members 390. For example, the cam member 380 may move in the axial direction to compress the elastic members 390.

In an embodiment, the cam member 380 may include the first cam portion 381 engaged with the first cam structure 371, the second cam portion 382 engaged with the second cam structure 372, and a connecting portion 383 connecting the first cam portion 381 and the second cam portion 382. In an embodiment, the first cam portion 381 and the second cam portion 382 may be moved together in the axial direction by the connecting portion 383. In an embodiment, the first cam portion 381 may include third protrusions 381b protruding toward the first cam structure 371 and third depressions 381a formed between the third protrusions 381b. In an embodiment, the second cam portion 382 may include fourth protrusions 382b protruding toward the second cam structure 372 and fourth depressions 382a formed between the fourth protrusions 382b.

In an embodiment, the elastic members 390 may be disposed between the cam member 380 and the fixing member (e.g., one of fixing members 330). The elastic members 390 may apply elastic forces to the cam member 380 in the axial direction. For example, the compressed elastic members 390 may increase a frictional force between the first cam structure 371 and the first cam portion 381 and a frictional force between the second cam structure 372 and the second cam portion 382.

In the unfolded state, the first protrusions 371b of the first cam structure 371 may make contact with the third depressions 381a of the first cam portion 381, and the first depressions 371a of the first cam structure 371 may make contact with the third protrusions 381*b* of the first cam portion 381. The second protrusions 372*b* of the second cam structure 372 may make contact with the fourth depressions 382*a* of the second cam portion 382, and the second depressions 372*a* of the second cam structure 372 may make contact with the fourth protrusions 382*b* of the second cam portion 382. At this time, the elastic members 390 may be less compressed than when the hinge structure 200 is in the free-stop section, or may be in an equilibrium state.

In the folded state included in the free-stop section, the first protrusions 371*b* of the first cam structure 371 may make contact with the third protrusions 381*b* of the first cam portion 381. The second protrusions 372*b* of the second cam structure 372 may make contact with the fourth protrusions 382*b* of the second cam portion 382. The cam member 380 may be located closer to the fixing member (e.g., one of fixing members 330) than when the hinge structure 200 is in the unfolded state, and depending on the movement of the cam member 380, the elastic members 390 may be more compressed than when the hinge structure 200 is in the unfolded state.

In the fully folded state, the first protrusions 371*b* of the first cam structure 371 may make contact with the third depressions 381*a* of the first cam portion 381, and the first depressions 371*a* of the first cam structure 371 may make contact with the third protrusions 381*b* of the first cam portion 381. The second protrusions 372*b* of the second cam structure 372 may make contact with the fourth depressions 382*a* of the second cam portion 382, and the second depressions 372*a* of the second cam structure 372 may make contact with the fourth protrusions 382*b* of the second cam portion 382. At this time, the elastic members 390 may be less compressed than when the hinge structure 200 is in the free-stop section, or may be in an equilibrium state.

In the folded state included in the free-stop section, the compressed elastic members 390 may form a larger frictional force between the first cam structure 371 and the first cam portion 381 and may form a larger frictional force between the second cam structure 372 and the second cam portion 382. The frictional forces may act in directions opposite to movements of the first arms 310 and the second arms 320. Due to the frictional forces, larger forces may be required to rotate the first arms 310 and the second arms 320.

For example, a driving force required to perform an unfolding or folding motion from the folded state included in the free-stop section may be greater than a driving force required to perform an unfolding or folding motion from the unfolded state or the fully folded state. That is, in the free-stop section, the hinge structure 200 may stably maintain the folded state by the engagement of the cam structures 371 and 372 and the cam member 380. Accordingly, the hinge structure 200 may provide the free-stop section capable of stably maintaining folded states at various angles.

When the hinge structure 200 deviates from the free-stop section and moves to the unfolded state or the fully folded state, the contact between the first protrusions 371*b* and the third protrusions 381*b* may be released, and the first protrusions 371*b* and the third protrusions 381*b* may move toward the third depressions 381*a* and the first depressions 371*a*. Furthermore, the contact between the second protrusions 372*b* and the fourth protrusions 382*b* may be released, and the second protrusions 372*b* and the fourth protrusions 382*b* may move toward the fourth depressions 382*a* and the second depressions 372*a*. At this time, the compressed elastic members 390 may be uncompressed and may more rapidly move the protrusions 371*b*, 372*b*, 381*b*, and 382*b*. This may be understood as conversion of potential energy stored in the compressed elastic members 390 into kinetic energy.

When the hinge structure 200 moves from the unfolded state and the fully folded state to the free-stop section, the first protrusions 371*b* and the third protrusions 381*b* may move along inclined surfaces to make surface-to-surface contact with each other. Furthermore, the second protrusions 372*b* and the fourth protrusions 382*b* may move along inclined surfaces to make surface-to-surface contact with each other. At this time, the cam member 380 may move toward the fixing member (e.g., one of the fixing members 330 in the axial direction) along the first arm shafts 311 and the second arm shafts 321, and the elastic members 390 may be compressed. That is, for a movement of the hinge structure 200 to the free-stop section, a relatively larger force may be required to compress the elastic members 390 than when the hinge structure 200 moves from the free-stop section.

Accordingly, when a relatively small force is applied, the electronic device 100 and/or the hinge structure 200 in the unfolded state or the fully folded state may remain unfolded or fully folded without moving to the free-stop state (e.g., without being folded or unfolded). For example, a user needs to apply a force sufficient to fold the electronic device 100.

The hinge structure 200 according to the embodiment may be configured to rapidly move to the unfolded state or the fully folded state when deviating from the free-stop section. The hinge structure 200 having moved to the unfolded state or the fully folded state may remain unfolded or fully folded, when a sufficient force required for deviation from the unfolded state or the fully folded state is not applied. Through the above-described motion of the hinge structure 200, the user may recognize that the unfolded state or the fully folded state of the electronic device 100 is firmly maintained.

Furthermore, when the hinge structure 200 moves from the free-stop section to the unfolded state or the fully folded state, the compressed elastic members 390 may be uncompressed, and the protrusions 371*b*, 372*b*, 381*b*, and 382*b* may collide with the depressions 371*a*, 372*a*, 381*a*, and 382*a*. The collision may generate sound or vibration, thereby enabling the user to recognize that the electronic device 100 successfully reaches the unfolded state and the fully folded state.

A hinge structure 200 according to embodiments of the disclosure may include a fixed structure 230 including a first guide rail 233 having an arc shape and a second guide rail 234 having an arc shape, in which the center of an arc of the first guide rail is a first axis of rotation R1 parallel to an axial direction and the center of an arc of the second guide rail is a second axis of rotation R2 parallel to the axial direction, a first rotary structure 210 that includes a first guide portion 213 accommodated in the first guide rail 233 and a first helical groove 214 extending around and along the first axis of rotation R1 and that rotates about the first axis of rotation R1, a second rotary structure 220 that includes a second guide portion 223 accommodated in the second guide rail 234 and a second helical groove 224 extending around and along the second axis of rotation R2 and that rotates about the second axis of rotation R2, and a sliding structure 240 that includes a first guide protrusion 241 accommodated in the first helical groove 214 and a second guide protrusion 242 accommodated in the second helical groove 224 and that slides in the axial direction relative to the fixed structure 230 as the first rotary structure 210 and the second rotary structure 220 rotate.

In various embodiments, the first rotary structure 210 may include a first coupling portion 211 having a substantially cylindrical shape and including a first arc surface 211a with the first axis of rotation R1 as the center thereof. The first guide portion 213 may include a protruding portion protruding in a direction of the first axis of rotation R1 and accommodated in the first guide rail 233. The first helical groove 214 may be formed on the first arc surface 211a. The second rotary structure 220 may include a second coupling portion 221 having a substantially cylindrical shape and including a second arc surface 221a with the second axis of rotation R2 as the center thereof. The second guide portion 223 may include a protruding portion protruding in a direction of the second axis of rotation R2 and accommodated in the second guide rail 234. The second helical groove 224 may be formed on the second arc surface 221a.

In various embodiments, the fixed structure 230 may include a sliding shaft 2351, 2352 extending in the axial direction, and the sliding structure 240 may be slidably coupled to the sliding shaft 2351, 2352.

In various embodiments, the first helical groove 214 may extend in a direction of the first axis of rotation R1 by a first length D and may extend at a first angle θ1 in a first rotational direction with respect to the first axis of rotation R1, and the second helical groove 224 may extend in a direction of the second axis of rotation R2 by a second length D substantially the same as the first length D and may extend at a second angle θ2 substantially the same as the first angle in a second rotational direction with respect to the second axis of rotation R2, the second rotational direction being opposite to the first rotational direction.

In various embodiments, the sliding structure 240 may be configured to slide in the axial direction by the first length D.

In various embodiments, the first helical groove 214 may extend in a direction to form a first twist angle $θ_{t1}$ with respect to the direction of the first axis of rotation R1, and the second helical groove 224 may extend in a direction to form a second twist angle $θ_{t2}$ with respect to the direction of the second axis of rotation R2, the second twist angle being equal to the first twist angle.

In various embodiments, the first guide protrusion 241 and the second guide protrusion 242 may be located between the first axis of rotation R1 and the second axis of rotation R2 when viewed in the axial direction.

In various embodiments, the sliding structure 240 may include the first area 240a that faces the fixed structure 230, the second area 240b that faces away from the first area 240a, and the sliding groove 243 formed through the first area and the second area. The fixed structure 230 may include the facing area 230a that faces the first area 240a of the sliding structure 240 and the screw 238 protruding from the facing area 230a. The screw 238 may penetrate the sliding structure 240 by passing through the sliding groove 243.

In various embodiments, the sliding groove 243 may extend in the axial direction by a first length D, and the first helical groove 214 and the second helical groove 224 may extend by the first length D when viewed in the axial direction.

In various embodiments, the sliding structure 240 may be configured to move to one side along the axial direction until the screw 238 makes contact with the first end portion 243-1 of the sliding groove 243 and move to an opposite side along the axial direction until the screw 238 makes contact with the second end portion 243-2 of the sliding groove 243.

In various embodiments, the screw 238 may include the head 2382 disposed on the second area 240b of the sliding structure 240 and the body 2381 that passes through the sliding groove 243 and that extends from the head 2382 to the fixed structure 230. The hinge structure may further include the elastic member 251 that is disposed between the head 2382 and the second area 240b and that presses the sliding structure 240 toward the fixed structure 230.

In various embodiments, the sliding structure 240 may include a plurality of first protrusions 240p that are formed on the first area 240a around the sliding groove 243 and that protrude toward the fixed structure 230. The fixed structure 230 may include a plurality of second protrusions 230p formed on the facing area 230a thereof and engaged with the plurality of first protrusions 240p. The elastic member 251 may be configured to be compressed when the first protrusions 240p and the second protrusions 230p are engaged to make surface-to-surface contact with each other.

In various embodiments, the fixed structure 230 may include a first extending shaft 351 extending to one side along the axial direction and the second extending shaft 352 extending to an opposite side along the axial direction. Each of the first extending shaft 351 and the second extending shaft 352 may be configured to pass through a portion of the sliding structure 240. The sliding structure 240 may include the first shaft tightening member 353 through which the first extending shaft 351 passes and that is at least partially press-fit onto the first extending shaft 351 and the second shaft tightening member 354 through which the second extending shaft 352 passes and that is at least partially press-fit onto the second extending shaft 352.

In various embodiments, the first shaft tightening member 353 may include a plurality of first slits (e.g., slits 3533) located in a radial direction with respect to the first extending shaft 351, and the plurality of first slits may be formed on an inner circumferential surface of the first shaft tightening member 353 and may extend along the axial direction. The second shaft tightening member 354 may include a plurality of second slits (e.g., slits 3533) located in a radial direction with respect to the second extending shaft 352, and the plurality of second slits may be formed on an inner circumferential surface of the second shaft tightening member 354 and extend along the axial direction.

In various embodiments, the first shaft tightening member 353 and the second shaft tightening member 354 may have threads 3531 formed on outer surfaces thereof. The hinge structure may further include nuts 355 that are fastened to the threads 3531 and that are movable in the axial direction relative to the first shaft tightening member 353 and the second shaft tightening member 354 along the threads. The nuts 355 may be configured to press-fit the first shaft tightening member 353 onto the first extending shaft 351 and press-fit the second shaft tightening member 354 onto the second extending shaft 352.

In various embodiments, the hinge structure may further include first arm shafts 311 extending parallel to the first axis of rotation R1 from the fixed structure 230, first arms 310 that rotate about the first arm shafts 311 and that include a first sliding pin 312 parallel to the first arm shafts 311, second arm shafts 321 extending parallel to the second axis of rotation R2 from the fixed structure 230, and second arms 320 that rotate about the second arm shafts 321 and that include second sliding pins 322 parallel to the second arm shafts 321. The first arms 310 may be configured to slide relative to the first rotary structure 210 in a state in which the first sliding pin 312 is accommodated in the first sliding grooves 215 of the first rotary structure 210. The second arms 320 may be configured to slide relative to the second rotary structure 220 in a state in which the second sliding pins 322 are accommodated in second sliding grooves 225 of the second rotary structure 220.

In various embodiments, the first rotary structure 210 may include first friction portions 216 including the first sliding grooves 215 and extending in a direction perpendicular to the first axis of rotation R1, and the second rotary structure 220 may include second friction portions 226 including the second sliding grooves 225 and extending in a direction perpendicular to the second axis of rotation R2. The hinge structure may further include first friction plates 361 that makes surface-to-surface contact with the first friction portions 216 and that is coupled to the first sliding pin 312 to rotate about the first arm shafts 311 together with the first arms 310 and second friction plates 362 that makes surface-to-surface contact with the second friction portions 226 and that is coupled to the second sliding pins 322 to rotate about the second arm shafts 321 together with the second arms 320.

In various embodiments, each of the first friction portions 216 and the second friction portions 226 may include a first portion 216a that has a first length W1 when viewed in the axial direction and that makes surface-to-surface contact with each of the first friction plates 361 and the second friction plates 362 and second portions 216b that has a second length W2 smaller than the first length W1 and that is spaced apart from each of the first friction plates 361 and the second friction plates 362. The second portions 216b may be connected to opposite sides of the first portion 216a in a direction perpendicular to the axial direction.

In various embodiments, the hinge structure may further include the cam member 380 coupled to the first arm shafts 311 and the second arm shafts 321 to move in the axial direction along the first arm shafts 311 and the second arm shafts 321 and elastic members 390 that applies an elastic force to the cam member 380. The first arms 310 may include a first cam structure 371 formed on an area around a through-hole of the first arm through which the first arm shafts 311 pass. The second arms 320 may include the second cam structure 372 formed on an area around a through-hole of the second arm through which the second arm shafts 321 pass. The cam member 380 may include the first cam portion 381 engaged with the first cam structure 371 and the second cam portion 382 engaged with the second cam structure 372. The first cam portion 381 and the first cam structure 371 may be configured to move the cam member 380 in a direction in which the elastic members 390 is compressed or in a direction in which the elastic members 390 is uncompressed, in response to rotation of the first arms 310. The second cam portion 382 and the second cam structure 372 may be configured to move the cam member 380 in the direction in which the elastic members 390 are compressed or in the direction in which the elastic members 390 is uncompressed, in response to rotation of the second arms 320.

In various embodiments, in a section in which the first arms 310 and the second arms 320 are disposed at an angle of not less than a first angle and not more than a second angle, the first cam structure 371 and the first cam portion 381 may maintain a state in which protruding portions thereof are engaged with each other, the second cam structure 372 and the second cam portion 382 may maintain a state in which protruding portions thereof are engaged with each other, and the elastic members 390 may maintain a predetermined compressed state.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, "adapted to or configured to", depending on the context, for example, hardware or software "suitable for," "having the ability to," "modified to, Can be used interchangeably with" "made to," "capable of," or "designed to." In some contexts, the expression "a device configured to" may mean that the device is "capable of" with other devices or components. For example, the phrase "a processor configured (or configured to perform) A, B, and C" refers to a dedicated processor (e.g., an embedded processor), or one or more programs stored in a memory device, for performing the corresponding operations, thereby executing one or more programs; It may mean a general-purpose processor (e.g., CPU or AP) capable of performing corresponding operations.

As used herein, the term "module" may include a unit implemented in hardware, software, or firmware, and may interchangeably be used with other terms, for example, "logic", "logic block", "part", or "circuitry". A "module" may be implemented mechanically or electronically, for example, known or to be developed, application-specific integrated circuit (ASIC) chips, field-programmable gate arrays (FPGAs), or a programmable logic device.

At least a portion of an apparatus (e.g., modules or functions thereof) or a method (e.g., operations) according to various embodiments may be implemented as instructions stored in a computer-readable storage medium (e.g., memory) in the form of a program module. When the instruction is executed by a processor (e.g., a processor), the processor may perform a function corresponding to the instruction. Computer-readable recording media include hard disks, floppy disks, magnetic media (e.g., magnetic tape), optical recording media (e.g., CD-ROM, DVD, magneto-optical media (e.g., floppy disks), built-in memory, etc.) An instruction may include code generated by a compiler or code that can be executed by an interpreter.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device according to the embodiments of the disclosure may include the hinge structure that provides torque greater than or equal to the restoring force of the display. Accordingly, a folding motion of the foldable electronic device or a folded state desired by a user may be stably maintained.

Furthermore, the hinge structures according to the embodiments of the disclosure may provide torque sufficient to cancel out the restoring force of the display without an increase in the thickness of the electronic device.

In addition, the disclosure may provide various effects that are directly or indirectly recognized.

What is claimed is:

1. A portable communication device comprising:
    a flexible display;
    a housing including a first housing portion accommodating a first display area of the flexible display, a second housing portion accommodating a second display area of the flexible display, and a hinge housing portion located between the first housing portion and the second housing portion; and
    a hinge structure substantially accommodated in the hinge housing portion and connected with the first housing portion and the second housing portion such that the first housing portion or the second housing portion is folded or unfolded with respect to an axis direction, the hinge structure including:
        a fixed structure accommodated in the hinge housing portion, the fixed structure including a first shaft and a second shaft parallel with each other and extending in a length direction of the fixed structure,
        a first rotary structure rotatably coupled with the fixed structure, the first rotary structure including a first extending portion configured to support the first display area, and a first connecting portion extended from the first extending portion,
        a second rotary structure rotatably coupled with the fixed structure, the second rotary structure including a second extending portion configured to support the second display area, and a second connecting portion extended from the second extending portion, and
        a sliding structure slidably coupled with the fixed structure via the first shaft and the second shaft, the sliding structure engaged in a helical shape with the first rotary structure and the second rotary structure, respectively, such that the sliding structure slides along the first shaft and the second shaft based at least in part on a rotation of at least one rotary structure of the first rotary structure or the second rotary structure.

2. The portable communication device of claim 1, wherein the hinge structure further includes:
    a first arm rotatably coupled with the first shaft and coupled with the first rotary structure via a first sliding pin; and
    a second arm rotatably coupled with the second shaft and coupled with the second rotary structure via a second sliding pin.

3. The portable communication device of claim 2, wherein the first extending portion of the first rotary structure includes a first sliding opening into which the first sliding pin is slidably inserted, and
    wherein the second extending portion of the second rotary structure includes a second sliding opening into which the second sliding pin is slidably inserted.

4. The portable communication device of claim 3, wherein the first sliding pin and the second sliding pin slide in a direction perpendicular to the length direction within the first sliding opening and the second sliding opening, respectively, based at least in part on the rotation of the at least one rotary structure.

5. The portable communication device of claim 1, wherein the sliding structure comprises a first helical portion and a second helical portion,
    wherein the first helical portion is engaged with a third helical portion of the first rotary structure, and
    wherein the second helical portion is engaged with a fourth helical portion of the second rotary structure.

6. The portable communication device of claim 5, wherein the first helical portion and the second helical portion are substantially symmetric such that the first rotary structure and the second rotary structure rotate in a substantially same amount.

7. The portable communication device of claim 5, wherein the first helical portion extends in a direction and forms a first twist angle with respect to the first shaft, and
    wherein the second helical portion extends in a direction and forms a second twist angle with respect to the second shaft, the second twist angle being equal to the first twist angle.

8. The portable communication device of claim 1, wherein the sliding structure further comprises:
    a first area configured to face the fixed structure;
    a second area configured to face away from the first area; and
    a sliding opening formed through the first area and the second area.

9. The portable communication device of claim 8, wherein the fixed structure further comprises a facing area and a fixing member, the facing area being configured to face the first area of the sliding structure and the fixing member protruding from the facing area.

10. The portable communication device of claim 9, wherein the fixing member comprises a head and a body, the head being disposed on the second area of the sliding structure, the body extending from the head to the fixed structure,
    wherein the hinge structure further comprises an elastic member disposed between the head and the second area, and
    wherein the elastic member is configured to press the sliding structure towards the fixed structure.

11. The portable communication device of claim 1, wherein the flexible display includes a folding area, the folding area being a portion of the display which is deformable during folding or unfolding of the display, and wherein a height of a portion of the folding area in a fully folded state in which the hinge structure is closed having a smallest angle comprises a same height as a height of the portion of the folding area in an unfolded state in which the hinge structure is open at a greatest angle.

12. The portable communication device of claim 1,
wherein the fixed structure further comprises a first extending shaft extending to one side along the axial direction and a second extending shaft extending to an opposite side along the axial direction,
wherein each of the first extending shaft and the second extending shaft is configured to pass through a portion of the sliding structure, and
wherein the sliding structure further comprises:
   a first shaft tightening member through which the first extending shaft passes, the first shaft tightening member being at least partially press-fit onto the first extending shaft, and
   a second shaft tightening member through which the second extending shaft passes, the second shaft tightening member being at least partially press-fit onto the second extending shaft.

13. The portable communication device of claim 12,
wherein the first shaft tightening member comprises a plurality of first slits located in a radial direction with respect to the first extending shaft,
wherein the plurality of first slits are formed on an inner circumferential surface of the first shaft tightening member and extend along the axial direction,
wherein the second shaft tightening member comprises a plurality of second slits located in a radial direction with respect to the second extending shaft, and
wherein the plurality of second slits are formed on an inner circumferential surface of the second shaft tightening member and extend along the axial direction.

14. The portable communication device of claim 12,
wherein the first shaft tightening member and the second shaft tightening member have threads formed on outer surfaces thereof,
wherein the hinge structure further comprises a nut fastened to the threads of the first shaft tightening member and a nut fastened to the threads of the second shaft tightening member, and
wherein the nuts are configured to:
   move in the axial direction relative to the first shaft tightening member and the second shaft tightening member along the threads,
   press-fit the first shaft tightening member onto the first extending shaft, and
   press-fit the second shaft tightening member onto the second extending shaft.

15. The portable communication device of claim 3,
wherein the first arm is configured to slide relative to the first rotary structure in a state in which the first sliding pin is accommodated in a first sliding opening of the first rotary structure, and
wherein the second arm is configured to slide relative to the second rotary structure in a state in which the second sliding pin is accommodated in a second sliding opening of the second rotary structure.

16. The portable communication device of claim 15,
wherein the first rotary structure further comprises a first friction portion including the first sliding opening and extending in a direction perpendicular to the first shaft, and
wherein the second rotary structure further comprises a second friction portion including the second sliding opening and extending in a direction perpendicular to the second shaft.

17. The portable communication device of claim 16,
wherein the hinge structure further comprises:
   a first friction plate coupled to the first sliding pin and configured to make surface-to-surface contact with the first friction portion and rotate together with the first arm; and
   a second friction plate coupled to the second sliding pin and configured to make surface-to-surface contact with the second friction portion and rotate together with the second arm.

18. The portable communication device of claim 17,
wherein each of the first friction portion and the second friction portion comprises:
   a first portion having a first length, the first portion being configured to make surface-to-surface contact with each of the first friction plate and the second friction plate, and
   a second portion having a second length smaller than the first length, the second portion being spaced apart from each of the first friction plate and the second friction plate, and
wherein the second portion is connected to an opposite side of the first portion in a direction perpendicular to the axial direction.

19. The portable communication device of claim 15, further comprising:
   a cam member configured to move in the axial direction along a first arm shaft being parallel to the first shaft and the second arm shaft being parallel to the second shaft; and
   an elastic member configured to apply an elastic force to the cam member,
wherein the first arm comprises a first cam structure formed on an area around a through-hole of the first arm through which the first arm shaft passes,
wherein the second arm comprises a second cam structure formed on an area around a through-hole of the second arm through which the second arm shaft passes,
wherein the cam member comprises a first cam portion engaged with the first cam structure and a second cam portion engaged with the second cam structure,
wherein the first cam portion and the first cam structure are configured to, based on a rotation of the first arm, move the cam member in a direction in which the elastic member is compressed or move the cam member in a direction in which the elastic member is uncompressed, and
wherein the second cam portion and the second cam structure are configured to, based on a rotation of the second arm, move the cam member in the direction in which the elastic member is compressed or move the cam member in the direction in which the elastic member is uncompressed.

20. The portable communication device of claim 19,
wherein, in a section in which the first arm and the second arm are disposed with respect each other at an angle of not less than a first angle and not more than a second angle, the first cam structure and the first cam portion maintain a state in which protruding portions thereof are engaged with each other,
wherein the second cam structure and the second cam portion maintain a state in which protruding portions thereof are engaged with each other, and wherein the elastic member maintains a predetermined compressed state.

* * * * *